(12) United States Patent
Takashima et al.

(10) Patent No.: US 7,310,217 B2
(45) Date of Patent: Dec. 18, 2007

(54) MONOLITHIC CAPACITOR AND MOUNTING STRUCTURE THEREOF

(75) Inventors: Hirokazu Takashima, Echizen (JP); Hiroshi Ueoka, Echizen (JP); Yoshikazu Takagi, Sabae (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 23 days.

(21) Appl. No.: 11/616,550

(22) Filed: Dec. 27, 2006

(65) Prior Publication Data
US 2007/0121275 A1 May 31, 2007

Related U.S. Application Data

(63) Continuation of application No. PCT/JP05/22075, filed on Dec. 1, 2005.

(30) Foreign Application Priority Data

| Dec. 24, 2004 | (JP) | ............................ 2004-373166 |
| Dec. 24, 2004 | (JP) | ............................ 2004-373167 |
| Nov. 15, 2005 | (JP) | ............................ 2005-329712 |
| Nov. 15, 2005 | (JP) | ............................ 2005-329713 |

(51) Int. Cl.
*H01G 4/228* (2006.01)

(52) U.S. Cl. .............. 361/306.3; 361/306.1; 361/306.2; 361/311; 361/313; 361/321.1; 361/321.2

(58) Field of Classification Search .......... 361/306.3, 361/306.1, 306.2, 301.1, 301.4, 308.1, 309, 361/311, 312, 313, 321.1, 321.2
See application file for complete search history.

(56) References Cited

U.S. PATENT DOCUMENTS

| 5,657,199 | A | * | 8/1997 | Devoe et al. ............... 361/328 |
| 5,973,907 | A |  | 10/1999 | Reed |
| 6,072,687 | A |  | 6/2000 | Naito et al. |
| 6,188,565 | B1 |  | 2/2001 | Naito et al. |
| 6,191,932 | B1 | * | 2/2001 | Kuroda et al. .............. 361/303 |
| 6,215,647 | B1 |  | 4/2001 | Naito et al. |

(Continued)

FOREIGN PATENT DOCUMENTS

JP          04-105311 A       4/1992

(Continued)

OTHER PUBLICATIONS

Official communication for PCT Application No. PCT/JP2005/022075 Mailed on Feb. 28, 2006.

(Continued)

*Primary Examiner*—Nguyen T. Ha
(74) *Attorney, Agent, or Firm*—Keating & Bennett, LLP

(57) ABSTRACT

A monolithic capacitor includes a main capacitor unit having first capacitor portions and a second capacitor portion arranged in a direction of lamination, with the first capacitor portion located towards at least one end in the direction of lamination, so that the first capacitor portion is located closer to a mounting surface than the second capacitor portion. The number of pairs of third and fourth lead-out portions for third and fourth internal electrodes in the second capacitor portion is less than the number of pairs of first and second lead-out portions for first and second internal electrodes in the first capacitor portion, so that the first capacitor portion contributes to decreasing ESL while the second capacitor portion contributes to increasing ESR.

16 Claims, 25 Drawing Sheets

U.S. PATENT DOCUMENTS

| | | | |
|---|---|---|---|
| 6,226,169 B1 | 5/2001 | Naito et al. | |
| 6,266,228 B1 | 7/2001 | Naito et al. | |
| 6,266,229 B1 | 7/2001 | Naito et al. | |
| 6,292,350 B1 * | 9/2001 | Naito et al. | 361/306.3 |
| 6,407,904 B1 | 6/2002 | Kuroda et al. | |
| 6,430,025 B2 | 8/2002 | Naito et al. | |
| 6,441,459 B1 | 8/2002 | Togashi et al. | |
| 6,657,848 B2 | 12/2003 | Togashi et al. | |
| 6,727,782 B2 * | 4/2004 | Sasaki et al. | 333/185 |
| 6,940,710 B1 * | 9/2005 | Lee et al. | 361/321.2 |
| 7,019,958 B2 * | 3/2006 | Togashi et al. | 361/303 |
| 7,088,569 B1 | 8/2006 | Togashi et al. | |

FOREIGN PATENT DOCUMENTS

| | | |
|---|---|---|
| JP | 08-064474 A | 3/1996 |
| JP | 11-144996 A | 5/1999 |
| JP | 11-154631 A | 6/1999 |
| JP | 2000-323354 A | 11/2000 |
| JP | 2001-185449 A | 7/2001 |
| JP | 2001-284170 A | 10/2001 |
| JP | 2002-100531 A | 4/2002 |

OTHER PUBLICATIONS

Official communication for corresponding Japanese Patent Application No. 2005-329713, mailed on Feb. 28, 2006.

Official communication for corresponding Japanese Patent Application No. 2005-329712, mailed on Feb. 28, 2006.

* cited by examiner

MONOLITHIC CAPACITOR AND MOUNTING STRUCTURE THEREOF

BACKGROUND OF THE INVENTION

1. Field of the Invention

The present invention relates to monolithic capacitors and mounting structures of the monolithic capacitors. More specifically, the present invention relates to a monolithic capacitor that is used in a high-frequency circuit and to a mounting structure of the monolithic capacitor.

2. Description of the Related Art

As a decoupling capacitor that is used in a power supply circuit for an MPU (Micro Processing Unit) in a high frequency range on the order of several GHz, for example, a monolithic capacitor having a structure described in Japanese Unexamined Patent Application Publication No. 11-144996 (Patent Document 1) is known. In the monolithic capacitor, a plurality of terminals is provided such that adjacent terminals have opposite polarities. Thus, the length of paths of currents from positive terminals to negative terminals is relatively short, and currents flow in various ways. Furthermore, currents are caused to flow in opposite directions so that magnetic fluxes are canceled, thereby decreasing ESL (Equivalent Series Inductance).

However, in the monolithic capacitor described in Patent Document 1, ESR (Equivalent Series Resistance) also decreases as ESL decreases. Therefore, the problem of steep impedance characteristics arises.

As another example, according to Japanese Unexamined Patent Application Publication No. 2001-284170 (Patent Document 2), for each internal electrode that is provided in a main capacitor unit to define a capacitor, only one lead-out portion extends out to the outer surface of the main capacitor unit and is electrically connected to an external terminal electrode, thereby increasing ESR of the monolithic capacitor.

According to the structure described in Patent Document 2, however, although ESR is increased, ESL is also increased. This causes the problem of degradation of high-frequency characteristics.

SUMMARY OF THE INVENTION

To overcome the problems described above, preferred embodiments of the present invention provide a monolithic capacitor in which ESL is decreased and ESR is increased at the same time, and a mounting structure of the monolithic capacitor which enables the low ESL characteristics of the monolithic capacitor in which ESL is decreased to be sufficiently exhibited.

A monolithic capacitor according to a preferred embodiment of the present invention includes a main capacitor unit having a monolithic structure including a lamination of a plurality of dielectric layers. According to the present invention, in order to solve the technical problems described above, the monolithic capacitor is configured as described below.

The main capacitor unit included in the monolithic capacitor includes first and second capacitor portions.

The first capacitor portion includes at least one pair of first and second internal electrodes opposing each other via a predetermined one of the dielectric layers so as to define a capacitance. The first internal electrode includes a plurality of first lead-out portions extending out to an outer surface of the main capacitor unit, and the second internal electrode includes a plurality of second lead-out portions extending out to the outer surface of the main capacitor unit.

The second capacitor portion includes at least one pair of third and fourth internal electrodes opposing each other via a predetermined one of the dielectric layers so as to define a capacitance, the third internal electrode includes at least one third lead-out portion extending out to the outer surface of the main capacitor unit, and the fourth internal electrode includes at least one fourth lead-out portion extending out to the outer surface of the main capacitor unit.

On the outer surface of the main capacitor unit, first, second, third, and fourth external terminal electrodes electrically connected individually to the first, second, third, and fourth lead-out portions are provided.

According to a first preferred embodiment of the present invention, the number of pairs of the third and fourth lead-out portions for one pair of the third and fourth internal electrodes is less than the number of pairs of the first and second lead-out portions for one pair of the first and second internal electrodes.

In a monolithic capacitor according to the first preferred embodiment of the present invention, at least one of the number of third lead-out portions for the third internal electrode and the number of fourth lead-out portions for the fourth internal electrode is less than the number of the first lead-out portions for the first internal electrode and the number of the second lead-out portions for the second internal electrode.

In this case, either the third internal electrode or the fourth internal electrode may have the same pattern as either the first internal electrode or the second internal electrode.

In the monolithic capacitor according to the first preferred embodiment of the present invention, preferably, the number of third lead-out portions for the third internal electrode and the number of fourth lead-out portions for the fourth internal electrode are less than the number of first lead-out portions for the first internal electrode and the number of second lead-out portions for the second internal electrode.

According to a second preferred embodiment of the present invention, a resonant frequency of the first capacitor portion is greater than a resonant frequency of the second capacitor portion, and an equivalent series resistance per layer provided by one pair of the third and fourth internal electrodes and an intervening one of the dielectric layers included in the second capacitor portion is greater than an equivalent series resistance per layer provided by one pair of the first and second internal electrodes and an intervening one of the dielectric layers included in the first capacitor portion.

In the monolithic capacitor according to the second preferred embodiment of the present invention, either the third internal electrode or the fourth internal electrode may have the same pattern as the first internal electrode or the second internal electrode.

At least one of the first and second external terminal electrodes may define at least one of the third and fourth external terminal electrodes.

Preferably, the first and second external terminal electrodes are arranged alternately.

In the main capacitor unit, preferably, the first capacitor portion and the second capacitor portion are arrayed in a direction of lamination, and the first capacitor portion is located on at least one end in the direction of lamination. In this case, more preferably, in the main capacitor unit, the second capacitor portion is sandwiched by two first capacitor portions in the direction of lamination.

Preferred embodiments of the present invention are also directed to a mounting structure of a monolithic capacitor, wherein a monolithic capacitor according to a preferred embodiment described above is mounted on a predetermined mounting surface. In the mounting structure of a monolithic capacitor according to preferred embodiments of the present invention, the monolithic capacitor is mounted with the main capacitor unit arranged so that the first capacitor portion is located closer to the mounting surface.

In the monolithic capacitor according to the first preferred embodiment of the present invention, the main capacitor unit is divided into the first and second capacitor portions, and the number of pairs of the third and fourth lead-out portions for one pair of the third and fourth internal electrodes in the first capacitor portion is less than the number of pairs of the first and second lead-out portions for one pair of the first and second internal electrodes in the second capacitor portion. Thus, ESL is further decreased in the first capacitor portion, so that it is possible to make the resonant frequency of the first capacitor portion greater than the resonant frequency of the second capacitor portion. Accordingly, the first capacitor portion affects frequency characteristics in a higher frequency range in the combined characteristics of the main capacitor unit. Therefore, the ESL characteristics of the first capacitor portion are reflected, so that the ESL of the main capacitor unit is decreased.

Furthermore, since the main capacitor unit is divided into the first and second capacitor portions and the resonant frequency of the first capacitor portion differs from the resonant frequency of the second capacitor portion, the ESR of the main capacitor unit is determined according to the combined characteristics of the ESR of the first capacitor portion and the ESR of the second capacitor portion. Since the number of pairs of the third and fourth lead-out portions for one pair of the third and fourth internal electrodes in the first capacitor portion is less than the number of pairs of the first and second lead-out portions for one pair of the first and second internal electrodes in the second capacitor portion as described above, ESR is further increased in the second capacitor portion. Thus, the second capacitor portion causes an increase in the ESR of the main capacitor unit.

Accordingly, a monolithic capacitor that satisfies both low ESL and high ESR is obtained.

In the monolithic capacitor according to the first preferred embodiment of the present invention, in order to make the number of pairs of the third and fourth lead-out portions less than the number of pairs of the first and second lead-out portions as described above, by making the number of third lead-out portions for the third internal electrode and the number of fourth lead-out portions for the fourth internal electrode less than the number of first lead-out portions for the first internal electrode and the number of fourth lead-out portions for the second internal electrodes, the decrease in ESL due to the first capacitor portion and the increase in ESR due to the second capacitor portion are reliably achieved.

In the monolithic capacitor according to the second preferred embodiment of the present invention, the main capacitor unit is divided into the first and second capacitor portions, and the resonant frequency of the first capacitor portion is greater than the resonant frequency of the second capacitor portion. Accordingly, the first capacitor portion affects frequency characteristics in a higher frequency range in the combined characteristics of the main capacitor unit. Therefore, the ESL characteristics of the first capacitor portion are reflected, so that the ESL of the main capacitor unit is decreased.

Furthermore, since the main capacitor unit is divided into the first and second capacitor portions and the resonant frequency of the first capacitor portion differs from the resonant frequency of the second capacitor portion, the ESR of the main capacitor unit is determined by the combined characteristics of the ESR of the first capacitor portion and the ESR of the second capacitor portion. This causes an increase in the ESR.

Accordingly, a monolithic capacitor that achieves both a low ESL and a high ESR.

In the monolithic capacitor according to preferred embodiments of the present invention, when the first and second external terminal electrodes are arranged alternately, paths of currents from positive terminals to negative terminals are shortened, and magnetic fluxes are canceled more effectively. Thus, the ESL in the first capacitor portion is further decreased.

In the main capacitor unit, when the first capacitor portion and the second capacitor portion are arrayed in a direction of lamination, and the first capacitor portion is located on at least one end in the direction of lamination, and the monolithic capacitor is mounted with the main capacitor unit arranged so that the first capacitor portion is located closer to the mounting surface, paths of currents that flow from positive external terminal electrodes to negative external terminal electrodes through internal electrodes are further shortened. Thus, ESL is decreased in the mounting structure. Accordingly, the low ESL characteristics of the monolithic capacitor in which ESL is decreased are sufficiently produced.

When the second capacitor portion is sandwiched by the two first capacitor portions in the direction of lamination in the main capacitor unit, when obtaining a mounting structure in which ESL is decreased as described above, the distinction between the upper side and the lower side of the main capacitor unit is irrelevant.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 3A and 3B are plan views showing the internal structure of a first capacitor portion shown in FIG. 2, in which FIG. 3A shows a cross-section of a first internal electrode, and FIG. 3B shows a cross-section of a second internal electrode.

FIGS. 4A and 4B are plan views showing the internal structure of a second capacitor portion shown in FIG. 2, in which FIG. 4A shows a cross-section of a third internal electrode and FIG. 1B shows a cross-section of a fourth internal electrode.

FIGS. 20A and 20B are plan views of dielectric layers, showing the internal structure of the first capacitor portion shown in FIG. 19, in which FIG. 20A shows across-section of a first internal electrode and FIG. 20B shows a cross-section of a second internal electrode.

FIGS. 21A and 21B are plan views of dielectric layers, showing the internal structure of the second capacitor portion shown in FIG. 19, in which FIG. 21A shows a cross-section of a third internal electrode and FIG. 21B shows a cross-section of a fourth internal electrode.

DETAILED DESCRIPTION OF PREFERRED EMBODIMENTS

Figure 1:
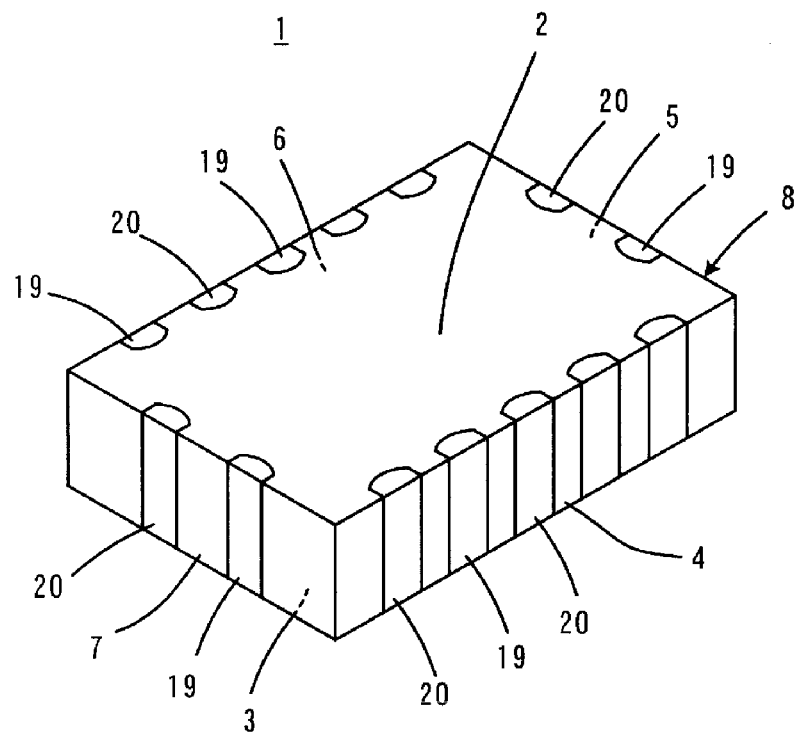
FIG. 1 is a perspective view showing the appearance of a monolithic capacitor according to a first preferred embodiment of the present invention.
Figure 2:
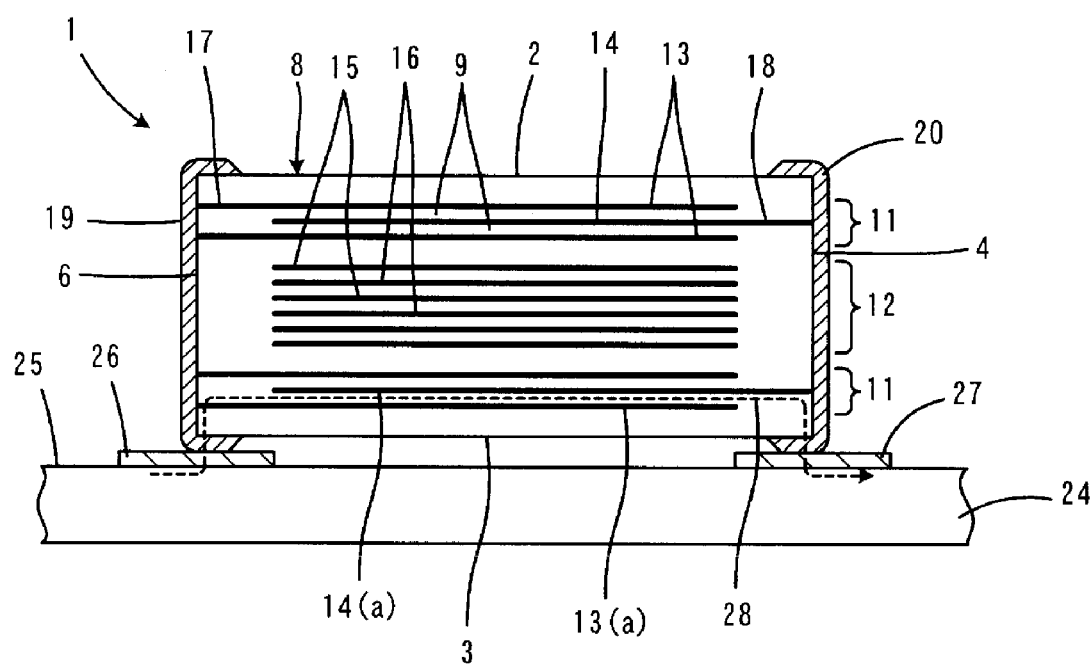
FIG. 2 is a sectional view showing the monolithic capacitor shown in FIG. 1 as mounted, in which the monolithic capacitor is shown in section taken along lines II-II in FIGS. 3A to 4B.

FIGS. 1 to 4B show a monolithic capacitor according to a first preferred embodiment of the present invention. FIG. 1 is a perspective view showing the appearance of the monolithic capacitor 1, and FIG. 2 is a sectional view showing a mounting structure of the monolithic capacitor 1. In FIG. 2, the monolithic capacitor 1 is shown in cross-section taken along lines II-II in FIGS. 3A, 3B, 4A and 4B described later.

The monolithic capacitor 1 preferably includes a substantially rectangular main capacitor unit 8 having two opposing principal surfaces 2 and 3 and four side surfaces 4, 5, 6, and 7 connecting the principal surfaces 2 and 3. The main capacitor unit 8 has a monolithic structure including a lamination of a plurality of dielectric layers 9 parallel to the principal surfaces 2 and 3, and composed of, for example, a dielectric ceramic material.

As shown in FIG. 2, the main capacitor unit 8 includes first capacitor portions 11 and a second capacitor portion 12. In this preferred embodiment, the first capacitor portions 11 and the second capacitor portion 12 are arrayed in the direction of lamination, and the second capacitor portion 12 is sandwiched by the two first capacitor portions 11 in the direction of lamination. Thus, the first capacitor portions 11 are located towards either end in the direction of lamination of the main capacitor unit 8.

Each of the first capacitor portions 11 includes at least one pair of first and second internal electrodes 13 and 14 opposing each other via a predetermined dielectric layer 9 so as to define a capacitor. The second capacitor portion 12 includes at least one pair of third and fourth internal electrodes 15 and 16 opposing each other via a predetermined dielectric layer 9 so as to define a capacitor.

In this preferred embodiment, in order to achieve a larger capacitance, at least two pairs of the first and second internal electrodes 13 and 14 and two pairs of the third and fourth internal electrodes 15 and 16 are provided.

Figure 3A:
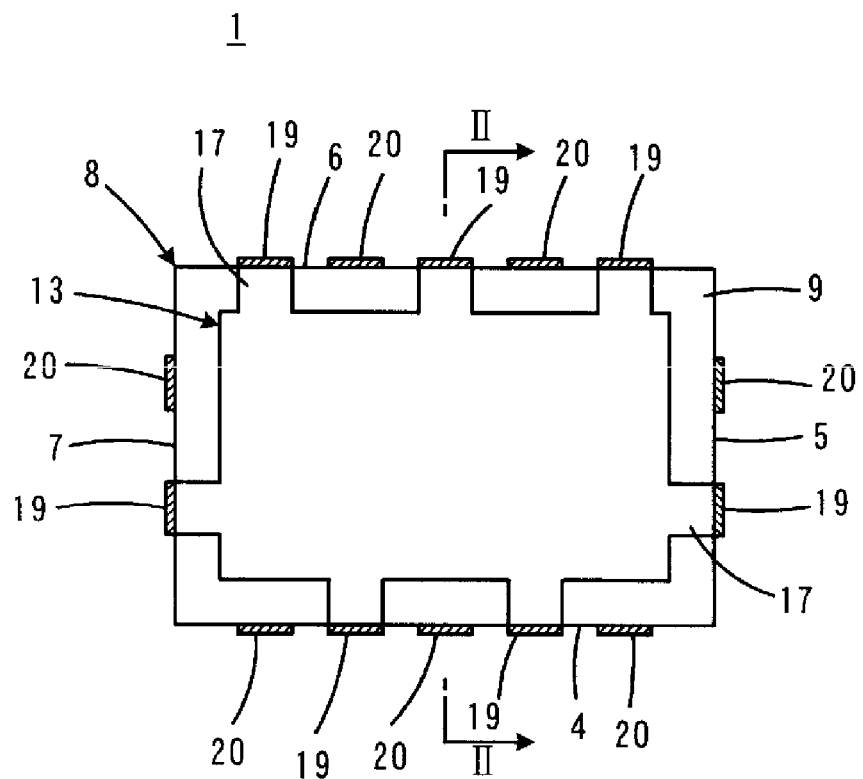
Figure 3B:
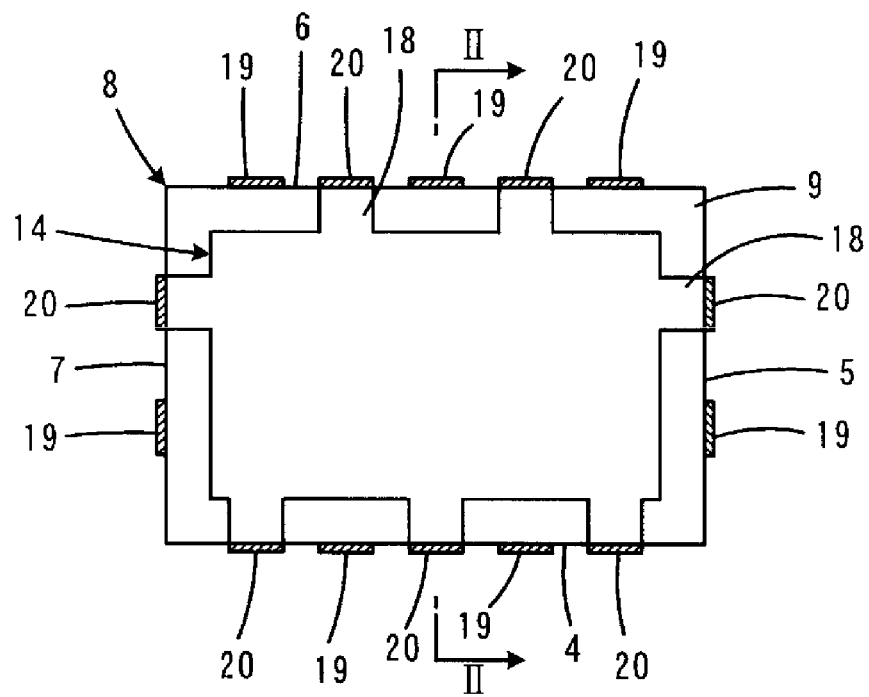

FIGS. 3A and 3B are plan views of the internal structure of the first capacitor portion 11, in which FIG. 3A shows across-section of the first internal electrode 13 and FIG. 3B shows a cross-section of the second internal electrode 14.

As shown in FIG. 3A, the first internal electrode 13 includes a plurality of, e.g., seven, first lead-out portions 17 extending out to the outer surface of the main capacitor unit 8, i.e., to the side surfaces 4 to 7. Furthermore, as shown in FIG. 3N, the second internal electrode 14 includes a plurality of, e.g., seven, second lead-out portions 18 extending out to the outer surface of the main capacitor unit 8, i.e., to the side surfaces 4 to 7. Thus, seven pairs of the first and second lead-out portions 17 and 18 are provided for one pair of the first and second internal electrodes 13 and 14.

On the side surfaces 4 to 7 of the main capacitor unit 8, a plurality of, e.g., seven, first external terminal electrodes 19 electrically connected individually to the first lead-out portions 17, and a plurality of, e.g., seven, second external terminal electrodes 20 electrically connected individually to the second lead-out portions 18 are provided. The first and second external terminal electrodes 19 and 20 are arranged to extend from the side surfaces 4 to 7 onto portions of the principal surfaces 2 and 3, as shown in FIGS. 1 and 2.

The locations on the side surfaces 4 to 7 to which the individual first lead-out portions 17 extend differ from the locations to which the individual second lead-out portions 18 extend. Thus, the locations of the individual first external terminal electrodes 19 provided on the side surfaces 4 to 7 differ from the locations of the individual second external terminal electrodes 20. The first external terminal electrodes 19 and the second external terminal electrodes 20 are alternately arranged on the side surfaces 4 to 7.

Figure 4A:
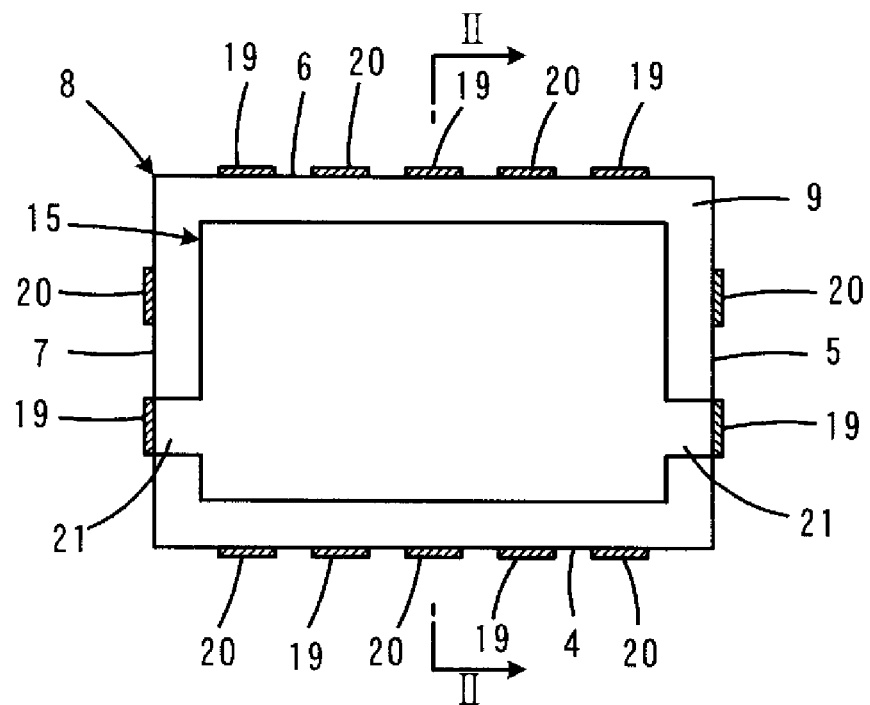
Figure 4B:
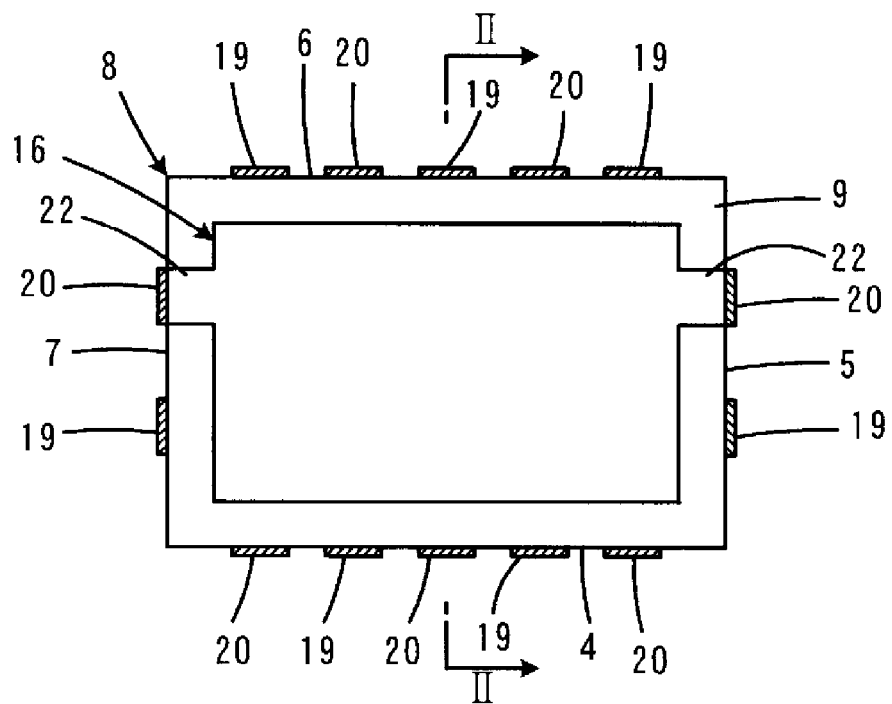

FIGS. 4A and 4B are plan views of the internal structure of the second capacitor portion 12, in which FIG. 4A shows a cross-section of the third internal electrode 15 and FIG. 4B shows a cross-section of the fourth internal electrode 16.

As shown in FIG. 4A, the third internal electrode 15 includes at least one, e.g., two, third lead-out portion 21 extending out to the outer surface of the main capacitor unit 8, i.e., to the side surfaces 5 and 7. Furthermore, as shown in FIG. 4B, the fourth internal electrode 16 includes at least one, e.g., two, fourth lead-out portion 22 extending out to the outer surface of the main capacitor unit 8, i.e., to the side surfaces 5 and 7. Thus, two pairs of the third and fourth lead-out portions 21 and 22 are provided for one pair of the third and fourth internal electrodes 15 and 16.

In this preferred embodiment, the third lead-out portions 21 are electrically connected to the first external terminal electrodes 19 described earlier, and the fourth lead-out portions 22 are electrically connected to the second external terminal electrodes 20 described earlier. That is, some of the first external terminal electrodes 19 are defined by the third external terminal electrodes that are to be electrically connected to the third lead-out portions 21, and some of the second external terminal electrodes 20 are defined by the fourth external terminal electrodes that are to be electrically connected to the fourth lead-out portions 22.

When the third and fourth lead-out portions 21 and 22 are electrically connected to the first and second external terminal electrodes 19 and 20 to which the first and second lead-out portions 17 and 18 are electrically connected as described above, the first capacitor portions 11 and the second capacitor portion 12 are connected in parallel within the monolithic capacitor 1.

Alternatively, as in preferred embodiments described later, third and fourth external terminal electrodes that are to be connected to the third and fourth lead-out portions 21 and 22 may be provided separately from the first and second external terminal electrodes.

In the first preferred embodiment described above, the number of pairs of the third and fourth lead-out portions 21 and 22 for one pair of the third and fourth internal electrodes 15 and 16 is less than the number of pairs of the first and second lead-out portions 17 and 18 for one pair of the first and second internal electrodes 13 and 14. More specifically, two pairs of the third and fourth lead-out portions 21 and 22 are provided for one pair of the third and fourth internal electrodes 15 and 16, and seven pairs of the first and second lead-out portions 17 and 18 are provided for one pair of the first and second internal electrodes 13 and 14 the former number is two and the latter number is seven.

Particularly, in the first preferred embodiment, the number of the third lead-out portions 21 for each of the third internal electrodes 15 and the number of the fourth lead-out portions 22 for each of the fourth internal electrodes 16 are less than the number of the first lead-out portions 17 for each of the first internal electrodes 13 and the number of the second lead-out portions 18 for each of the second internal electrodes 14. More specifically, two of the third lead-out portions 21 are provided for each of the third internal electrodes 15, two of the fourth lead-out portions 22 are provided for each of the fourth internal electrodes 16, seven of the first lead-out portions 17 are provided for each of the first internal electrodes 13, and seven of the second lead-out portions 18 for each of the second internal electrodes 14.

Thus, currents flow in various directions in the first and second internal electrodes 13 and 14. Therefore, through canceling of magnetic fluxes, the ESL of the first capacitor portion 11 is less than the ESL of the second capacitor portion 12.

On the other hand, in the third and fourth internal electrodes 15 and 16, as described above, the number of the third lead-out portions 21 for each of the third internal electrodes 15 and the number of the fourth lead-out portions 22 for each of the fourth internal electrodes 16 are less than the number of the first lead-out portions 17 for each of the first internal electrodes 13 and the number of the second lead-out portions 18 for each of the second internal electrodes 14. Thus, assuming that the effects of the internal electrodes 13 to 16 or the lead-out portions 17, 18, 21, and 22 on ESRs do not differ between the first capacitor portion 11 and the second capacitor portion 12, and that other conditions such as the materials of the internal electrodes 13 to 16 are the same, currents flow in a smaller number of directions in the third and fourth internal electrodes 15 and 16 than in the first and second internal electrodes 13 and 14. Therefore, the ESR of the second capacitor portion 12 is greater than the ESR of the first capacitor portion 11.

From another perspective, in the first preferred embodiment, the number of the third lead-out portions 21 for each of the third internal electrodes 15 and the number of the fourth lead-out portions 22 for each of the fourth internal electrodes 16 are less than the number of the first lead-out portions 17 for each of the first internal electrodes 13 and the number of the second lead-out portions 18 for each of the second internal electrodes 14. Thus, assuming that other conditions such as the materials of the internal electrodes 13 to 16 are the same, the ESL of the first capacitor portion 11 is less than the ESL of the second capacitor portion 12. Accordingly, the resonant frequency of the first capacitor portion 11 is greater than the resonant frequency of the second capacitor portion 12.

On the other hand, since the number of the third lead-out portions 21 and the number of the fourth lead-out portions 22 are less than the number of the first lead-out portions 17 and the number of the second lead-out portions 18, assuming that the effects of the internal electrodes 13 to 16 or the lead-out portions 17, 18, 21, and 22 on ESRs do not differ between the first capacitor portion 11 and the second capacitor portion 12, the ESR per layer provided by one pair of the third and fourth internal electrodes 15 and 16 and the intervening dielectric layer 9 included in the second capacitor portion 12 is greater than the ESR per layer provided by one pair of the first and second internal electrodes 13 and 14 and the intervening dielectric layer 9 included in the first capacitor portion 11.

In the characteristics of the monolithic capacitor 1, the low ESL characteristics due to the first capacitor portions 11 are effectively provided, and high ESR characteristics are provided due to the ESR characteristics of the first capacitor portions 11 and the ESR characteristics of the second capacitor portion 12. Thus, both low ESL and high ESR are achieved with the monolithic capacitor 1.

FIG. 2 shows a structure in which the monolithic capacitor 1 is mounted on a mounting surface 25 of a circuit board 24. On the mounting surface 25 of the circuit board 24, conductive lands 26 and 27 are provided, and the first and second external terminal electrodes 19 and 20 are electrically connected respectively to the conductive lands 26 and 27, for example, by soldering (not shown).

In the mounting structure described above, the monolithic capacitor 1 is mounted with the main capacitor unit 8 arranged such that one of the first capacitor portions 11 is located closer to the mounting surface 25 than the second capacitor portion 12.

In the monolithic capacitor 1 mounted as described above, when the first external terminal electrode is a positive terminal and the second external terminal electrode 20 is a negative terminal, considering a loop of the flow of currents that flow from the positive terminal to the negative terminal through the internal electrodes 13 to 16, currents that flow through the two lowermost internal electrodes 13(a) and 14(a) affect ESL values more significantly as the frequency increases, as indicated by a broken arrow 28 in FIG. 2. Thus, when the first capacitor portion 11 is located closer to the mounting surface 25 as described above, ESL is further decreased in the mounted monolithic capacitor 1.

When the second capacitor portion 12 is sandwiched by the two first capacitor portions 11 in the direction of lamination, as in the first preferred embodiment, the distinction between the upper side and the lower side of the main capacitor unit 8 is irrelevant. Thus, whether the principal surface 3 faces the mounting surface 25 as shown in FIG. 2 or the principal surface 2 faces the mounting surface 25, although not shown, ESL is decreased as described above.

Figure 5:
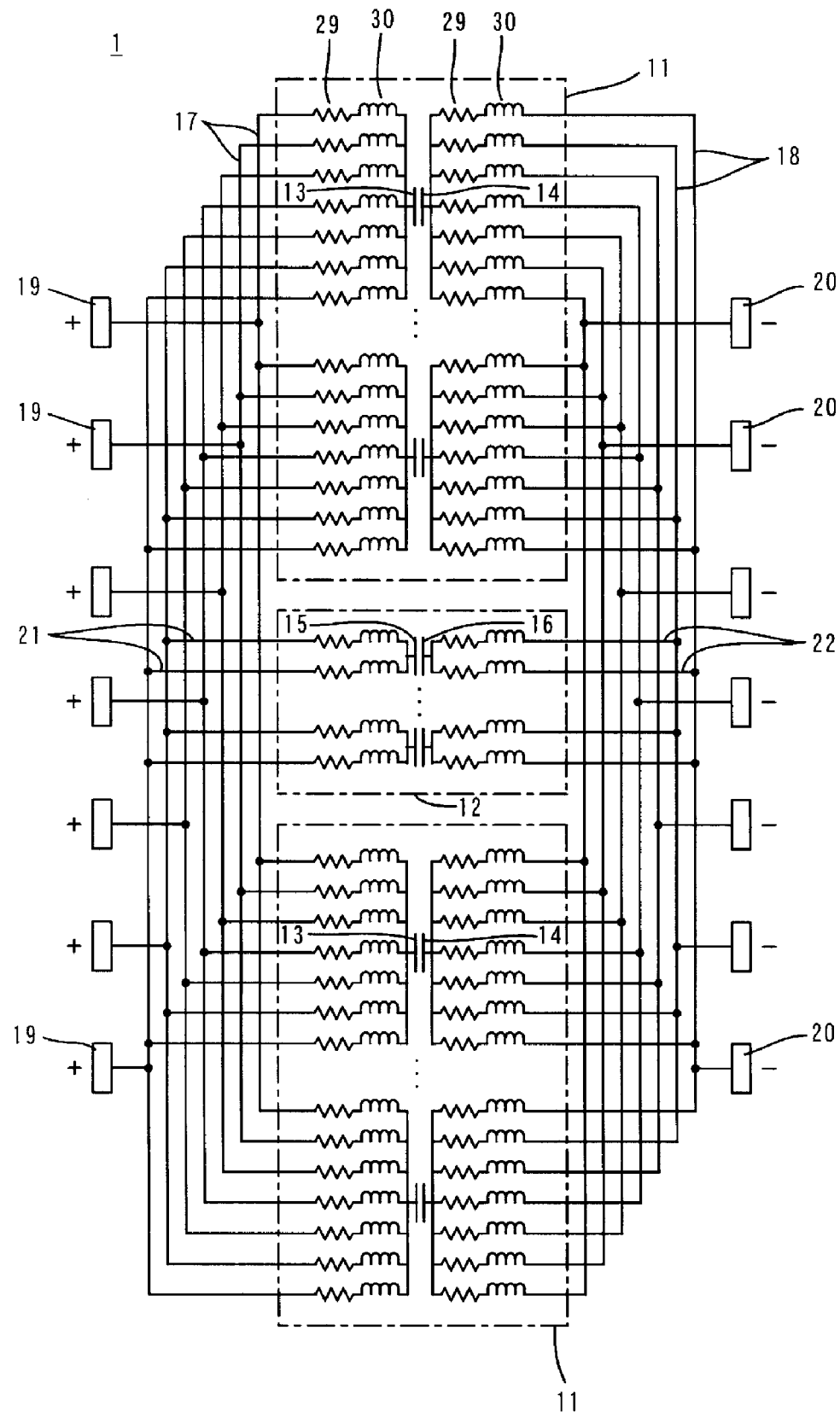
FIG. 5 is a diagram schematically showing an equivalent circuit of the monolithic capacitor shown in FIG. 1.

FIG. 5 schematically shows an equivalent circuit of the monolithic capacitor 1 described above. In order to show corresponding relationships between elements shown in FIG. 5 and elements shown in FIGS. 1 to 4B, in FIG. 5, elements corresponding to those shown in FIGS. 1 to 4B are designated by the same reference signs.

In FIG. 5, for each of the first to fourth internal electrodes 13 to 16, one internal electrode is indicated by one line. In the first capacitor portion 11, two pairs of the first and second internal electrodes 13 and 14 are shown, and by showing a dotted line between the two pairs of the first and second internal electrodes 13 and 14, it is indicated that a greater number of the first and second internal electrodes 13 and 14 may be provided. Similarly, in the second capacitor portion 12, two pairs of the third and fourth internal electrodes 15 and 16 are shown, and by showing a dotted line between the two pairs of the third and fourth internal electrodes 15 and 16, it is indicated that a greater number of the third and fourth internal electrodes 15 and 16 may be provided.

When FIG. 5 is compared to FIG. 2 described earlier, the number of the first and second internal electrodes 13 and 14 in the first capacitor portion 11 does not coincide. It is to be understood that this is because only representative ones of the first and second internal electrodes 13 and 14 are shown in FIG. 2.

As shown in FIG. 5, for each of the lead-out portions 17, 18, 21, and 22, an ESR 29 and an ESL 30 are produced.

Figure 6:
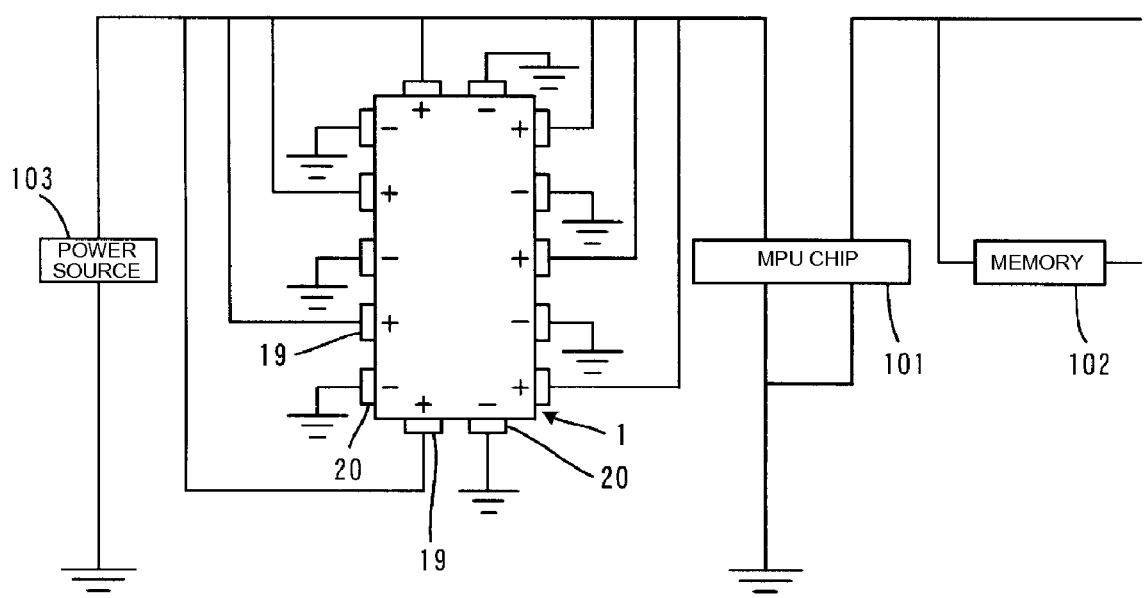
FIG. 6 is a diagram showing the circuit configuration of an MPU in which the monolithic capacitor shown in FIG. 1 is used as a decoupling capacitor.

FIG. 6 is a diagram which explains a preferable application of the monolithic capacitor 1 according to the present preferred embodiment. More specifically, FIG. 6 is a diagram showing the circuit configuration of an MPU in which the monolithic capacitor 1 is used as a decoupling capacitor.

The MPU includes an MPU chip 101 and a memory 102. A power source 103 supplies electric power to the MPU chip 101. On a power supply circuit between the power source 103 and the MPU chip 101, the monolithic capacitor 1 is connected so as to function as a decoupling capacitor. Furthermore, on the side of the memory 102 with respect to the MPU chip 101, although not shown, a signal circuit is provided.

The monolithic capacitor 1 used as a decoupling capacitor in the MPU described above functions as a quick power supply as well as to absorb noise or smooth variation in power supply. Thus, in the monolithic capacitor 1 used as a decoupling capacitor, ESL should be minimized. The monolithic capacitor according to this preferred embodiment can be advantageously used as a decoupling capacitor.

Figure 7A:
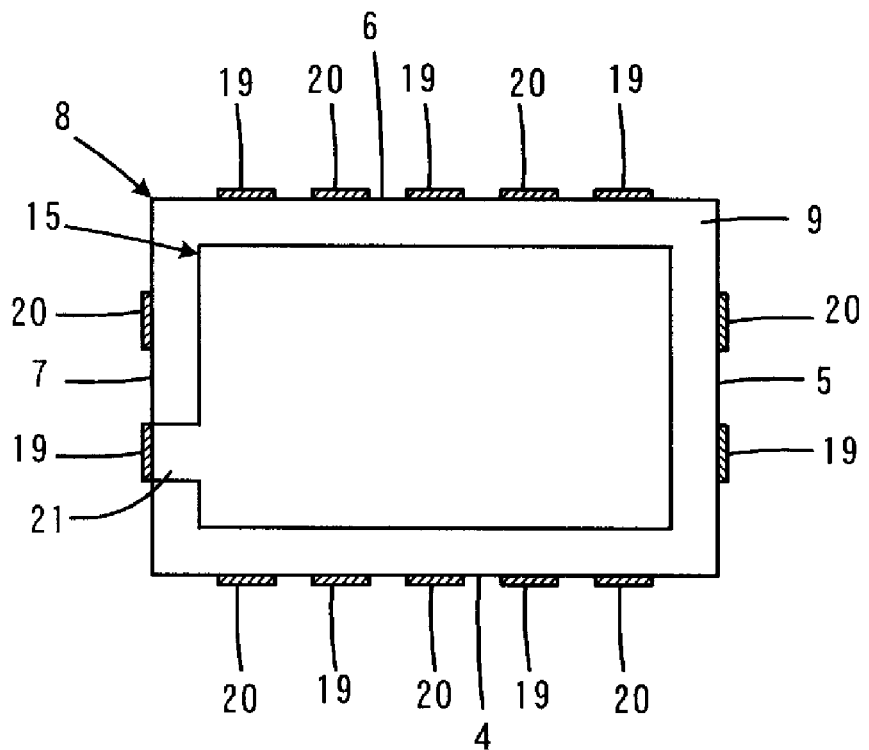
FIGS. 7A and 7B are diagrams for explaining a monolithic capacitor according to a second preferred embodiment of the present invention, corresponding to FIGS. 4A and 4B.
Figure 7B:
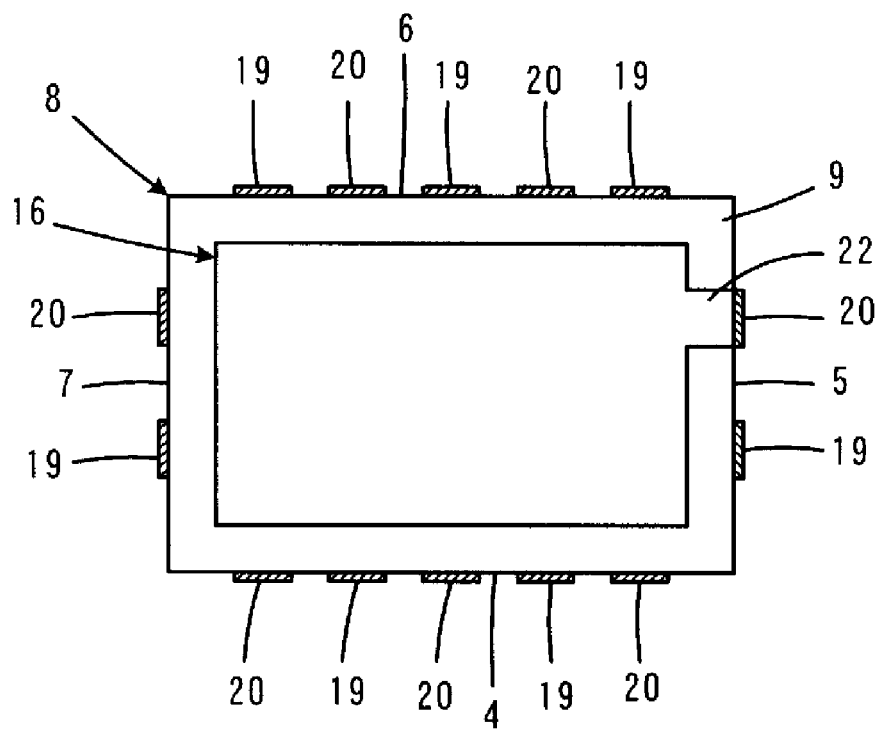

FIGS. 7A and 7B are diagrams for explaining a monolithic capacitor 1a according to a second preferred embodiment of the present invention, corresponding to FIGS. 4A and 4B. In FIGS. 7A and 7B, elements corresponding to those shown in FIGS. 4A and 4B are designated by the same reference signs, and the description thereof is omitted.

Compared to the first preferred embodiment described above, in the second preferred embodiment, the third internal electrode 15 includes only one third lead-out portion 21, and the fourth internal electrode 16 includes one fourth lead-out portion 22. The configuration is otherwise preferably the same as that in the first preferred embodiment.

According to the second preferred embodiment, only one pair of the third and fourth lead-out portions 21 and 22 is provided for one pair of the third and fourth internal electrodes 15 and 16 included in the second capacitor portion 12. Thus, the ESR in the second capacitor portion 12 is further increased as compared to the first preferred embodiment.

Figure 8A:
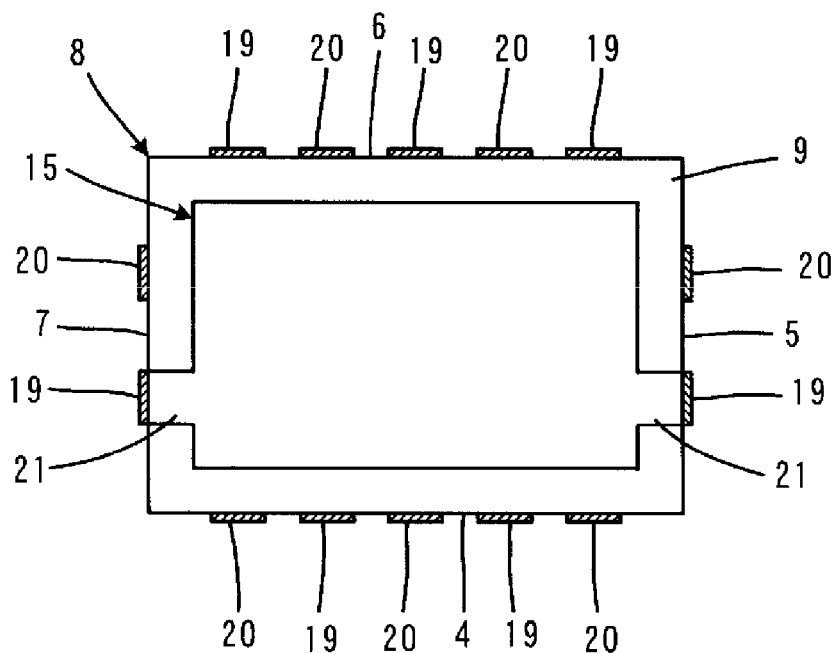
FIGS. 8A and 8B are diagrams for explaining a monolithic capacitor according to a third preferred embodiment of the present invention, corresponding to FIGS. 4A and 4B.
Figure 8B:
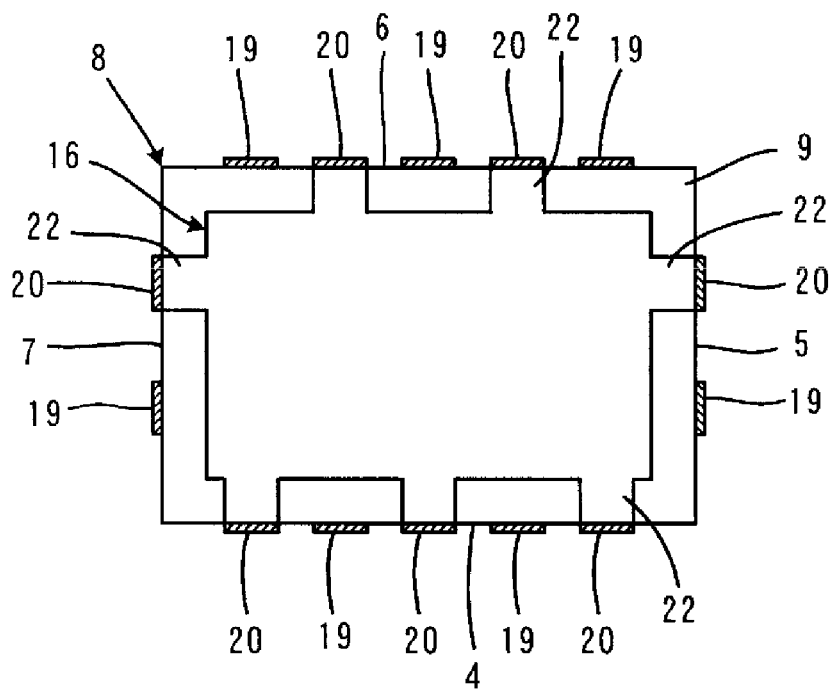

FIGS. 8A and 8B are diagrams for explaining a monolithic capacitor 1b according to a third preferred embodiment of the present invention, corresponding to FIGS. 4A and 4B. In FIGS. 8A and 8B, elements corresponding to those shown in FIGS. 4A and 4B are designated by the same reference signs, and the description thereof is omitted.

In the third preferred embodiment, one of the third internal electrode 15 and the fourth internal electrode 16 has the same pattern as either the first internal electrode 13 or the second internal electrode 14 shown in FIGS. 3A and 3B. More specifically, as shown in FIG. 8B, the fourth internal electrode 16 has the same pattern as the second internal electrode 14 shown in FIG. 3B. Thus, the fourth internal electrode 16 includes seven fourth lead-out portions 22. The configuration is otherwise substantially the same as that in the first preferred embodiment.

In the third preferred embodiment, one fourth internal electrode 16 includes seven fourth lead-out portions 22. However, one third internal electrode 15 includes only two third lead-out portions 21. Thus, the number of pairs of the third and fourth lead-out portions 21 and 22 is two, which is less than the number of pairs of the first and second lead-out portions 17 and 18, i.e., seven. Therefore, the ESR of the second capacitor portion 12 is greater than the ESR of the first capacitor portion 11.

From another perspective, the third preferred embodiment satisfies the condition that at least one of the number of the third lead-out portions 21 for each of the third internal electrodes 15 and the number of the fourth lead-out portions 22 for each of the fourth internal electrodes 16 is less than the number of the first lead-out portions 17 for each of the first internal electrodes 13 and the number of the second lead-out portions 18 for each of the second internal electrodes 14. Thus, the ESR per layer provided by one pair of the third and fourth internal electrodes 15 and 16 and the intervening dielectric layer 9 included in the second capacitor portion 12 is less than that in the first preferred embodiment, the ESR per layer is greater than the ESR per layer given by one pair of the first and second internal electrodes 13 and 14 and the intervening dielectric layer 9 included in the first capacitor portion 11.

Figure 9A:
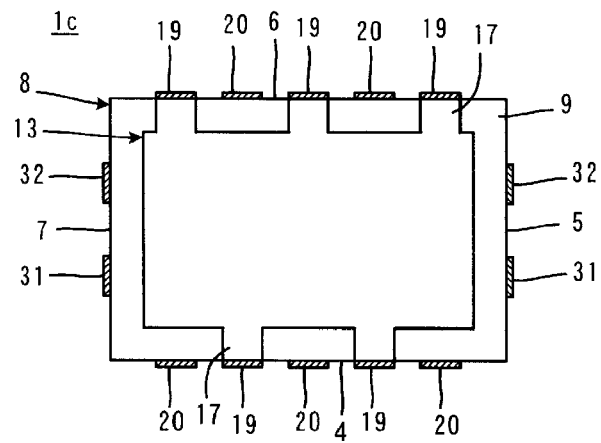
FIGS. 9A to 9D explain a monolithic capacitor according to a fourth preferred embodiment of the present invention, in which FIGS. 9A and 9B correspond to FIGS. 3A and 3B, respectively, and FIGS. 9C and 9D correspond to FIGS. 4A and 4B, respectively.

FIGS. 9A to 9D explain a monolithic capacitor 1c according to a fourth preferred embodiment of the present invention. FIGS. 9A and 9A correspond to FIGS. 3A and 3B, respectively, and FIGS. 9C and 9C correspond to FIGS. 4A and 4B, respectively. In FIGS. 9A to 9D, elements corresponding to those shown in FIGS. 3A to 4B are designated by the same reference signs, and the description thereof is omitted.

Figure 9B:
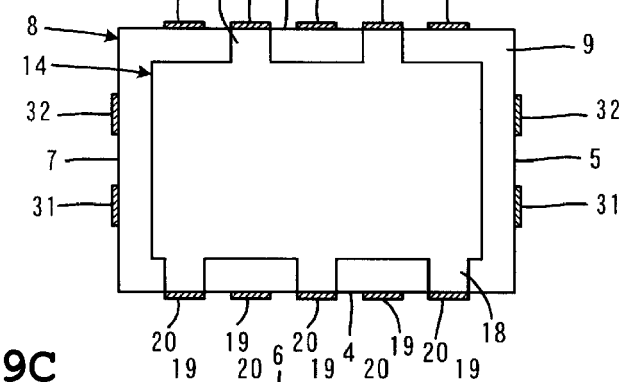
Figure 9C:
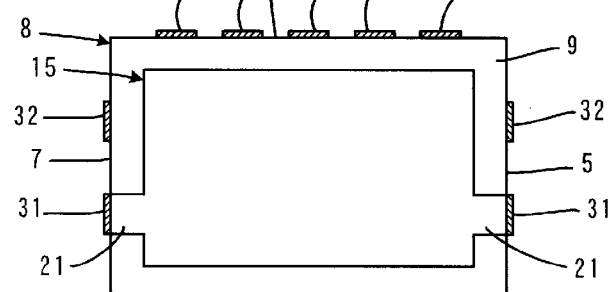
Figure 9D:
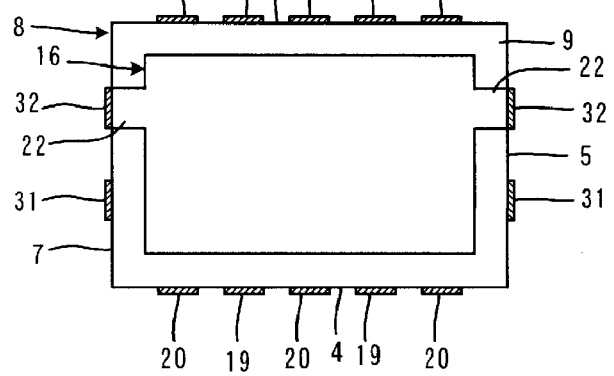

In the fourth preferred embodiment, third and fourth external terminal electrodes 31 and 32 are separately provided. More specifically, external terminal electrodes provided on the shorter side surfaces 5 and 7 of the main capacitor unit 8 are the third and fourth external terminal electrodes 31 and 32 instead of the first and second external terminal electrodes 19 and 20. As shown in FIGS. 9C and 9D, the third lead-out portions 21 of the third internal electrode 15 and the fourth lead-out portions 22 of the fourth internal electrode 16 are electrically connected to the third and fourth external terminal electrodes 31 and 32, respectively.

On the other hand, as shown in FIG. 9A, the first internal electrode 13 includes only five first lead-out portions 17, and these first lead-out portions 17 extend out only to the longer side surfaces 4 and 6 of the main capacitor unit 8 and are electrically connected to the first external terminal electrodes 19. Furthermore, as shown in FIG. 9B, the second internal electrode 14 includes only five second lead-out portions 18, and these second lead-out portions 18 extend out only to the longer side surfaces 4 and 6 of the main capacitor unit 8 and are electrically connected to the second external terminal electrodes 20.

The configuration is otherwise substantially the same as that in the first preferred embodiment.

According to the fourth preferred embodiment, compared to the first preferred embodiment, assuming that conditions other than the number of the first lead-out portions 17 and the number of the second lead-out portions 18 are the same, the resonant frequency of the first capacitor portion 11 is further reduced. Furthermore, the ESL of the first capacitor portion 11 is further increased.

Figure 10A:
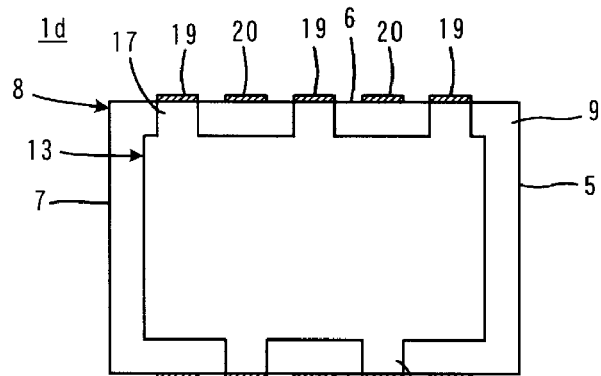
FIGS. 10A to 10D explain a monolithic capacitor according to a fifth preferred embodiment of the present invention, in which FIGS. 10A and 10B correspond to FIGS. 3A and 3B, respectively, and FIGS. 10C and 10D correspond to FIGS. 4A and 4B, respectively.
Figure 10B:
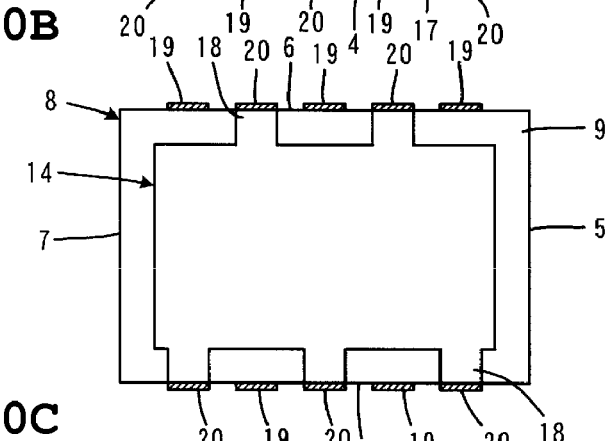

FIGS. 10A to 10D explain a monolithic capacitor 1d according to a fifth preferred embodiment of the present invention. FIGS. 10A and 10B correspond to FIGS. 3A and 3B, respectively, and FIGS. 10C and 10D correspond to FIGS. 4A and 4B, respectively. In FIGS. 10A to 10D, elements corresponding to those shown in FIGS. 3A to 4B are designated by the same reference signs, and the description thereof is omitted.

In the fifth preferred embodiment, no external terminal electrodes are provided on the shorter side surfaces 5 and 7 of the main capacitor unit 8. That is, the first and second external terminal electrodes 19 and 20 are provided on only the longer side surfaces 4 and 6 of the main capacitor unit 8.

Figure 10C:
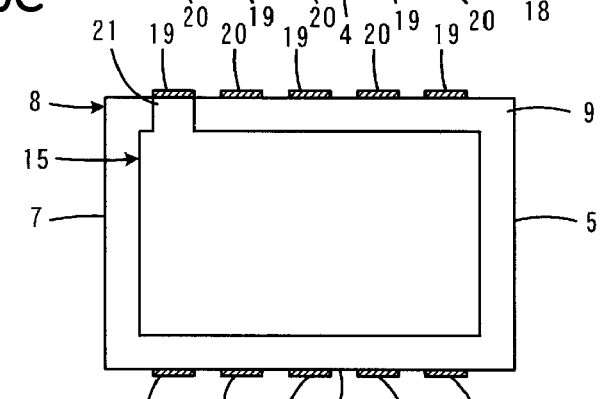
Figure 10D:
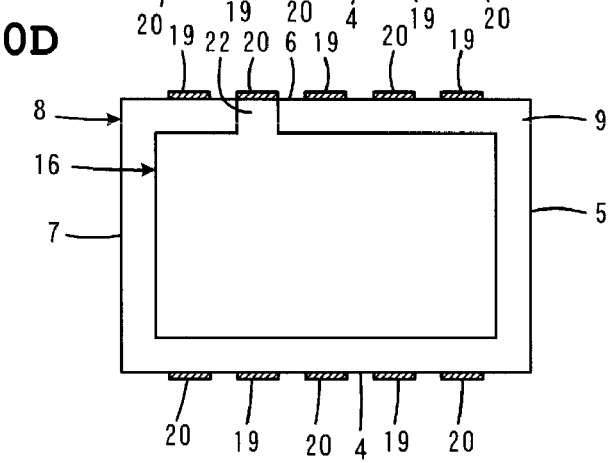

Furthermore, in the fifth preferred embodiment, as shown in FIG. 10C, the third internal electrode 15 includes one third lead-out portion 21, and the third lead-out portion 21 is electrically connected to one of the first external terminal electrodes 19. Furthermore, as shown in FIG. 10C, the fourth internal electrode 16 includes one fourth lead-out portion 22, and the fourth lead-out portion 22 is electrically connected to one of the second external terminal electrodes 20.

The configuration is otherwise substantially the same as that in the first preferred embodiment.

The fifth preferred embodiment has the significance of clarifying that the present invention is applicable to the monolithic capacitor 1d, in which external terminal electrodes are not provided on the shorter side surfaces 5 and 7 of the main capacitor unit 8.

Figure 11A:
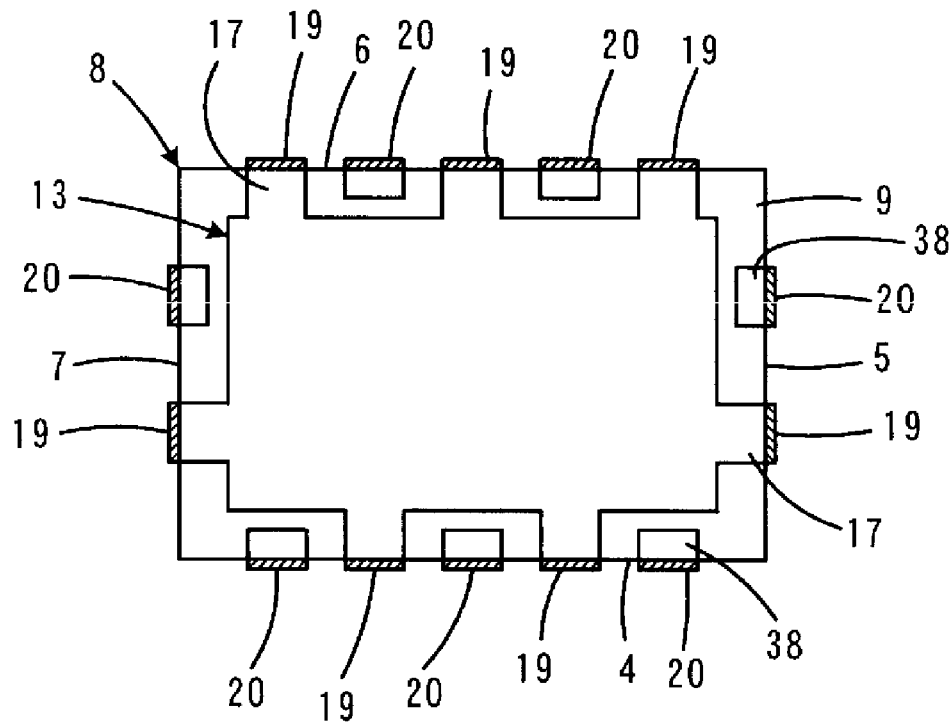
FIGS. 11A and 11B are diagrams for explaining a monolithic capacitor according to a sixth preferred embodiment of the present invention, corresponding to FIGS. 3A and 3B.
Figure 11B:
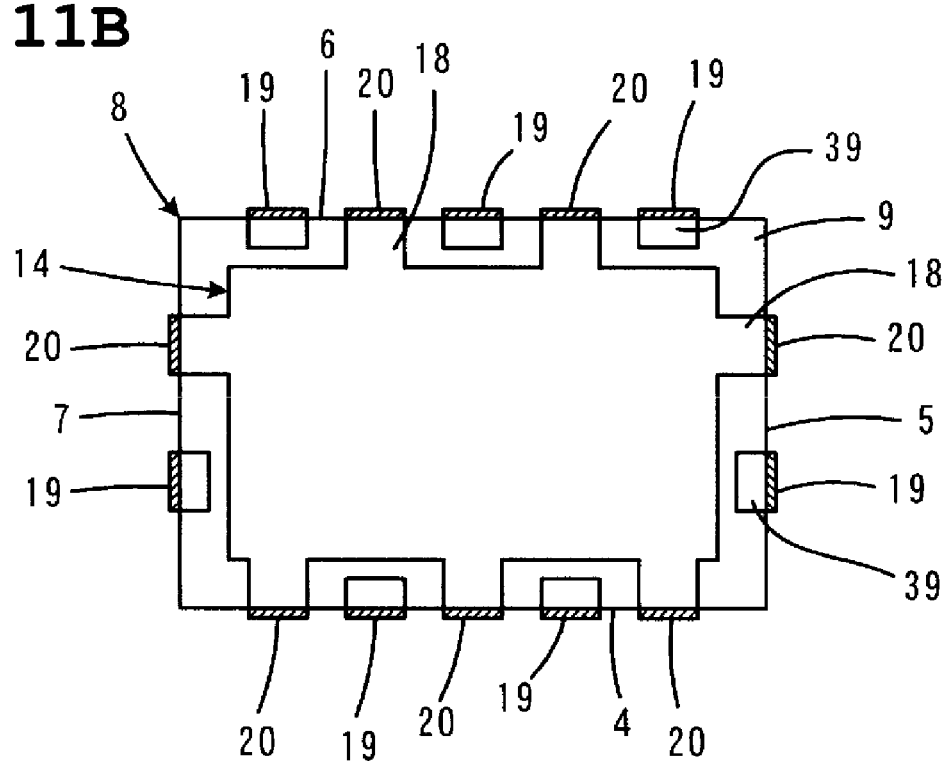

FIGS. 11A and 11B are diagrams for explaining a monolithic capacitor 1e according to a sixth preferred embodiment of the present invention, corresponding to FIGS. 3A and 3B. In FIGS. 11A and 11B, elements corresponding to those shown in FIGS. 3A and 3B are designated by the same reference signs, and the description thereof is omitted.

In the sixth preferred embodiment, as shown in FIG. 11A, dummy lead-out portions 38 are provided on a dielectric layer 9 in which the first internal electrode 13 is provided. Furthermore, as shown in FIG. 11B, dummy lead-out portions 39 are provided on a dielectric layer 9 in which the second internal electrode 14 is provided.

The dummy lead-out portions 38 and 39 are located in the periphery of the dielectric layers 9. The dummy lead-out portions 38 are located between a plurality of the first lead-out portions 17 and are electrically connected to the second external terminal electrodes 20. The dummy lead-out portions 39 are located between a plurality of the second lead-out portions 18 and are electrically connected to the first external terminal electrodes 19.

With the dummy lead-out portions 38 and 39 provided as described above, it is possible to reduce a difference in height that could arise in the main capacitor unit 8 due to the thicknesses of the internal electrodes 13 and 14, and it is possible to enhance the bonding strength of the external terminal electrodes 19 and 20 with the main capacitor unit 8.

Figure 12A:
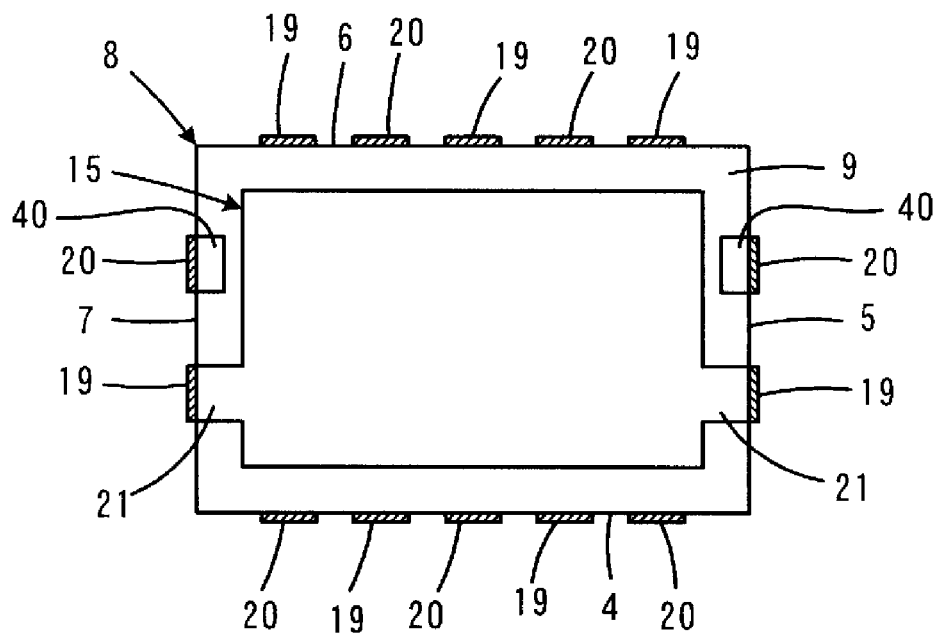
FIGS. 12A and 12B are diagrams for explaining a monolithic capacitor according to a seventh preferred embodiment of the present invention, corresponding to FIGS. 4A and 4B.
Figure 12B:
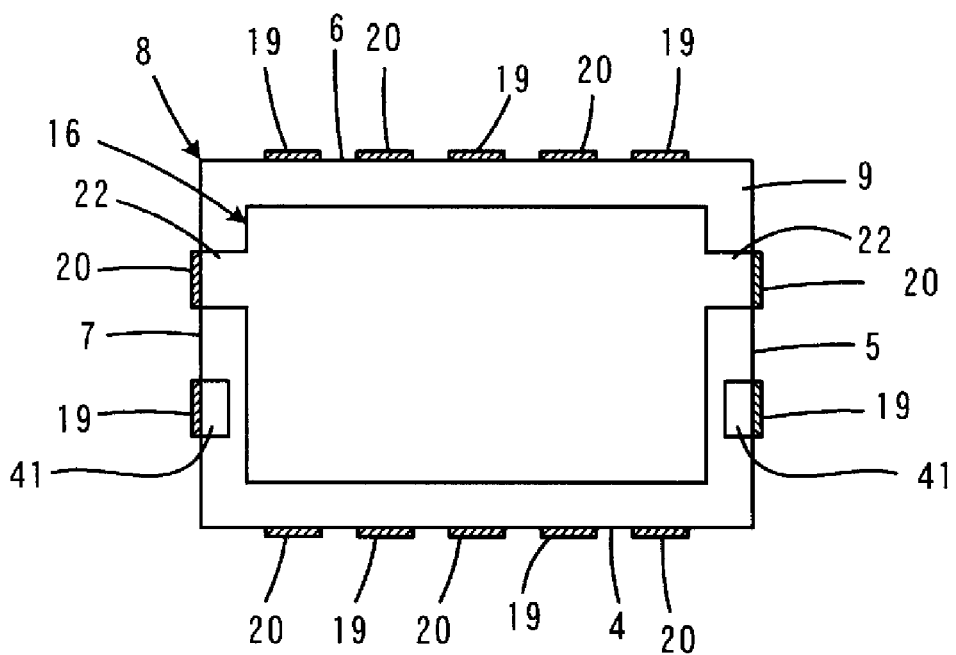

FIGS. 12A and 12B are diagrams for explaining a monolithic capacitor 1f according to a seventh preferred embodiment of the present invention, corresponding to FIGS. 4A and 4B. In FIGS. 12A and 12B, elements corresponding to those shown in FIGS. 4A and 4B are designated by the same reference signs, and the description thereof is omitted.

In the seventh preferred embodiment, as shown in FIG. 12A, dummy lead-out portions 40 are provided on a dielectric layer 9 in which the third internal electrode 15 is provided. Furthermore, as shown in FIG. 12B, dummy lead-out portions 41 are provided on a dielectric layer 9 in which the fourth internal electrode 16 is provided.

The dummy lead-out portions 40 and 41 are located along the shorter sides of the dielectric layers 9. The dummy lead-out portions 40 are electrically connected to the second external terminal electrodes 20 provided on the shorter side surfaces 5 and 7 of the main capacitor unit 8. The dummy lead-out portions 41 are electrically connected to the first external terminal electrodes 19 provided on the shorter side surface 5 and 7 of the main capacitor unit 8.

The dummy lead-out portions 40 and 41 described above exhibit substantially the same operation and advantages as the dummy lead-out portions 38 and 39 described earlier and shown in FIGS. 11A and 11B.

As a modification of the seventh preferred embodiment shown in FIGS. 12A and 12B, dummy lead-out portions may further be provided along the longer sides of the dielectric layers 9. Also in this case, the dummy lead-out portions are electrically connected individually to the first and second external terminal electrodes 19 and 20 provided on the longer side surfaces 4 and 6 of the main capacitor unit 8.

Figure 13:
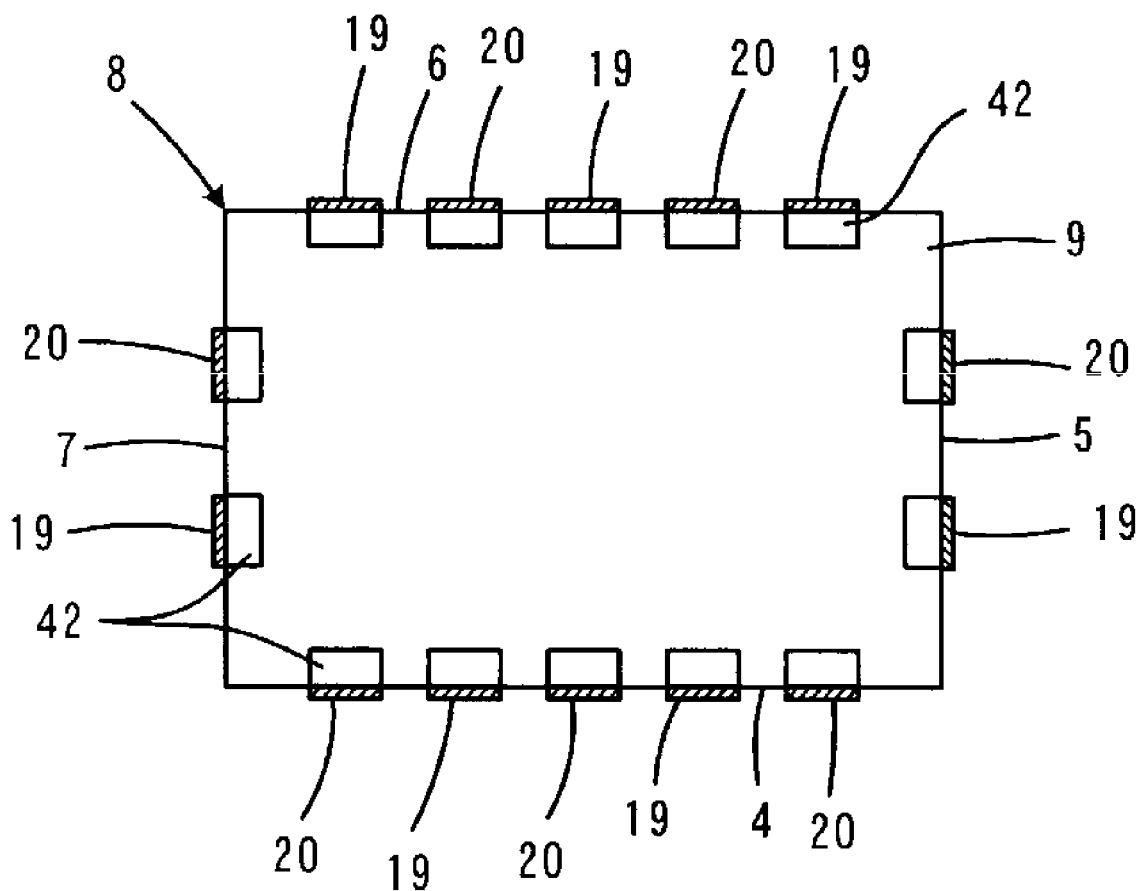
FIG. 13 is a plan view of a dielectric layer for explaining a monolithic capacitor according to an eighth preferred embodiment of the present invention.

FIG. 13 is a diagram for explaining a monolithic capacitor 1g according to an eighth preferred embodiment of the present invention. In FIG. 13, many elements that are similar to those shown in FIGS. 3A and 3B or FIGS. 4A and 4B are shown. Thus, in FIG. 13, elements corresponding to those shown in FIGS. 3A and 3B or FIGS. 4A and 4B are designated by the same reference signs, and the description thereof is omitted.

FIG. 13 shows a dielectric layer 9 in which no internal electrode is provided among the dielectric layers 9 included in the main capacitor unit 8. Such a dielectric layer 9 in which no internal electrode is provided is located at an end of the main capacitor unit 8 in the direction of lamination or at a boundary of the first capacitor portion 11 and the second capacitor portion 12.

In the eighth preferred embodiment, as shown in FIG. 13, a plurality of dummy lead-out portions 42 are provided along the periphery of the dielectric layer 9 in which no internal electrode is provided. The dummy lead-out portions 42 are electrically connected to the external terminal electrodes 19 or 20. The dimensions of the dummy lead-out portions 42 are substantially the same as the dummy lead-out portions 38 to 41 described earlier, and are preferably arranged so as not to overlap the main portions of the internal electrodes 13 to 16.

The dummy lead-out portions 42 also provide substantially the same operation and advantages as the dummy lead-out portions 38 to 41 described earlier.

The sixth to eighth preferred embodiments including dummy lead-out portions, described above, may be used individually. However, preferably, two or more of the preferred embodiments are used in combination, and most preferably, the three preferred embodiments are implemented in combination.

Figure 14A:
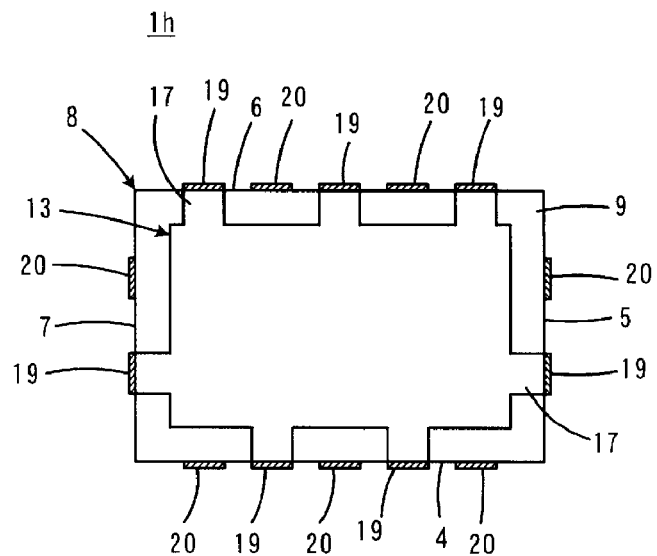
FIGS. 14A to 14C are diagrams for explaining a monolithic capacitor according to a ninth preferred embodiment of the present invention, corresponding to FIGS. 3A and 3B.
Figure 14B:
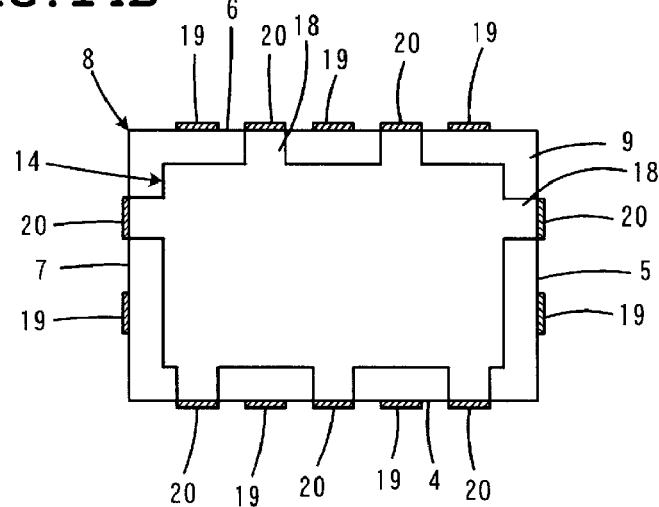
Figure 14C:
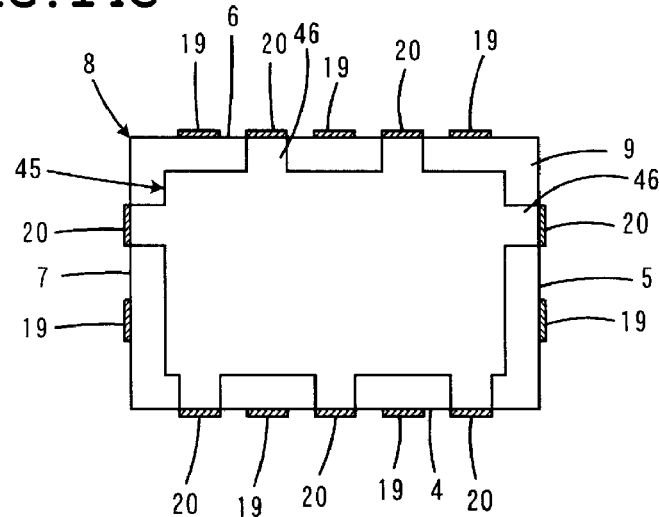

FIGS. 14A to 14C are diagrams for explaining a monolithic capacitor 1h according to a ninth preferred embodiment of the present invention, corresponding to FIGS. 3A and 3B. In FIGS. 14A to 14C, elements corresponding to those shown in FIGS. 3A and 3B are designated by the same reference signs, and the description thereof is omitted.

FIGS. 14A and 14B show the first and second internal electrodes 13 and 14 shown in FIGS. 3A and 3B, respectively. FIG. 14C shows a dummy internal electrode 45. In this preferred embodiment, the dummy internal electrode 45 has the same pattern as the second internal electrode 14 shown in FIG. 14B. That is, the dummy internal electrode 45 includes lead-out portions 46 extended out to the side surfaces 4 to 7 of the main capacitor unit 8, and the lead-out portions 46 are electrically connected to the second external terminal electrodes 20.

As described earlier, in order to form the first capacitor portion 11 (refer to FIG. 2), the first internal electrode 13 shown in FIG. 14A and the second internal electrode shown in FIG. 14B are laminated so as to oppose each other. In this preferred embodiment, in the monolithic structure described above, at least one dummy internal electrode 45 is laminated adjacent to the second internal electrode 14 at an end and/or in the middle in the direction of lamination.

By including the dummy internal electrode 45 in the monolithic structure as described above, although the capacitance does not increase, the bonding strength of the second external terminal electrodes 20 with the main capacitor unit 8 can be enhanced. Thus, this preferred embodiment is advantageous in a case where a large capacitance is not needed but the bonding strength of the external terminal electrodes 20 is ensured while allowing lamination of a certain number of dielectric layers 9.

As a modification of the ninth preferred embodiment, a dummy internal electrode having the same pattern as the first internal electrode 13 may be provided.

Figure 15A:
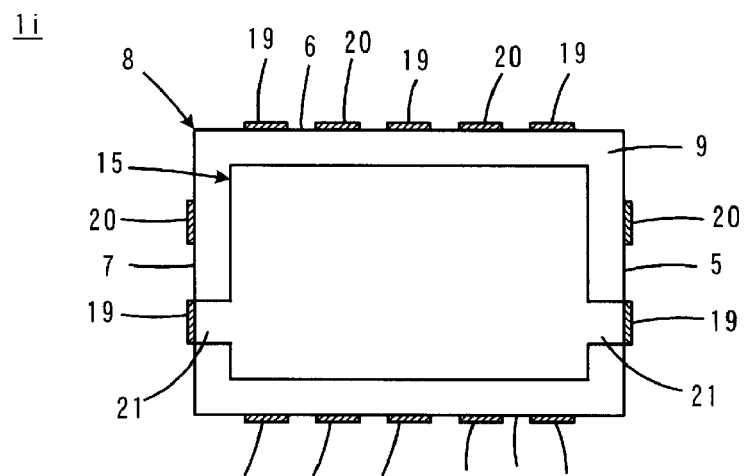
FIGS. 15A to 15C are diagrams for explaining a monolithic capacitor according to a tenth preferred embodiment of the present invention, corresponding to FIGS. 4A and 4B.
Figure 15B:
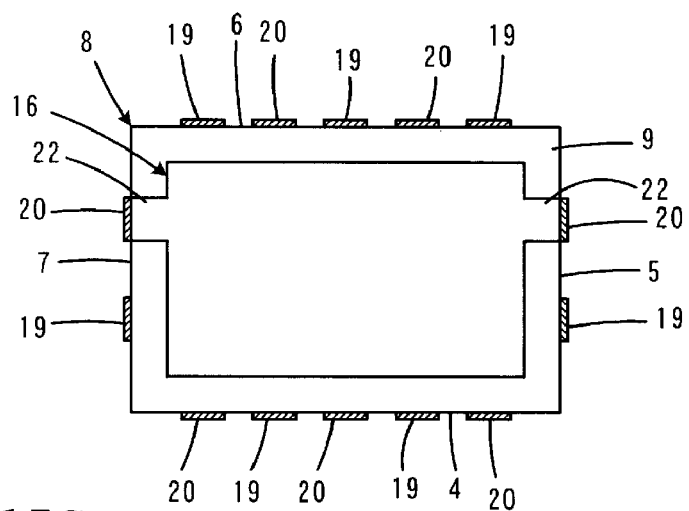
Figure 15C:
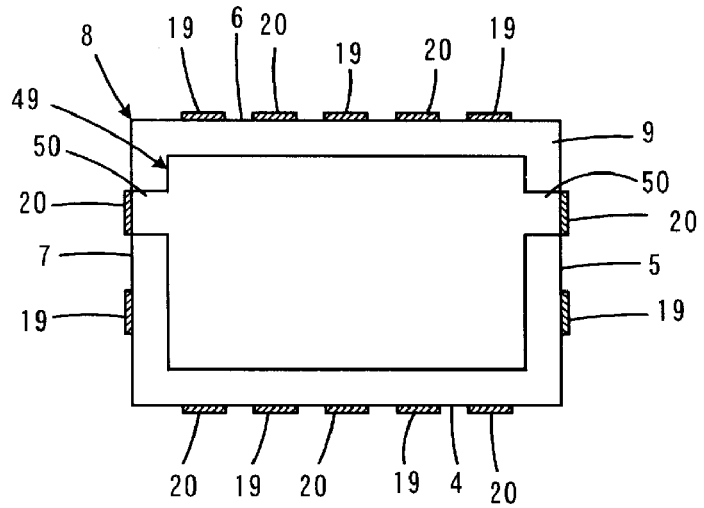

FIGS. 15A to 15C are diagrams for explaining a monolithic capacitor 1i according to a tenth preferred embodiment of the present invention. In FIGS. 15A to 15C, elements corresponding to those shown in FIGS. 4A and 4B are designated by the same reference signs, and the description thereof is omitted.

FIGS. 15A and 15B show the third and fourth internal electrodes 15 and 16 shown in FIGS. 4A and 4B, respectively. FIG. 15C shows a dummy internal electrode 49. In this preferred embodiment, the dummy internal electrode 49 has the same pattern as the fourth internal electrode 16 shown in FIG. 15B. That is, the dummy internal electrode 49 has lead-out portions 50 extended out to the shorter side surfaces 5 and 7 of the main capacitor unit 8, and the lead-out portions 50 are electrically connected to the second external terminal electrodes 20.

As described earlier, when the third internal electrode 15 shown in FIG. 15A and the fourth internal electrode 16 shown in FIG. 15B are laminated so as to oppose each other to define the second capacitor portion 12 (refer to FIG. 2), at least one dummy internal electrode 49 is laminated adjacent to the fourth internal electrode 16 in the monolithic structure at an end and/or in the middle in the direction of lamination. The dummy internal electrode 49 described above produces substantially the same operation and advantages as the dummy internal electrode 45 shown in FIG. 14C.

As a modification of the tenth preferred embodiment, a dummy internal electrode having the same pattern as the third internal electrode 15 may be provided.

Figure 16A:
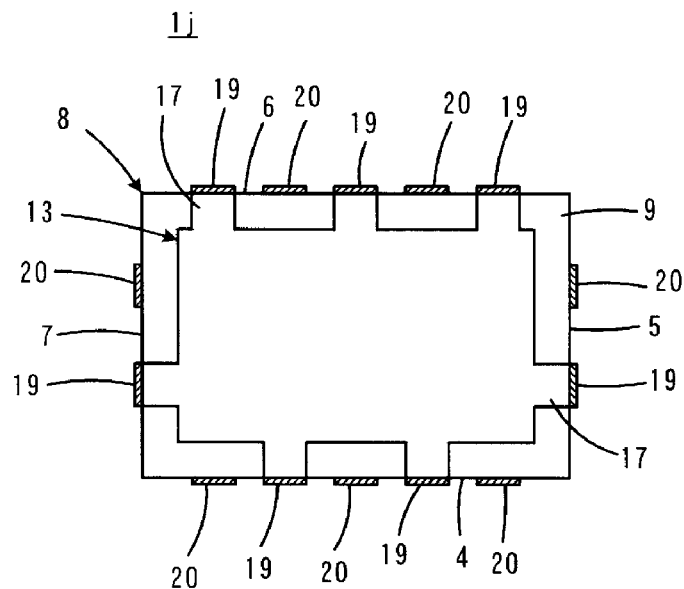
FIGS. 16A to 16C are diagrams for explaining a monolithic capacitor according to an eleventh preferred embodiment of the present invention, corresponding to FIGS. 3A and 3B.
Figure 16B:
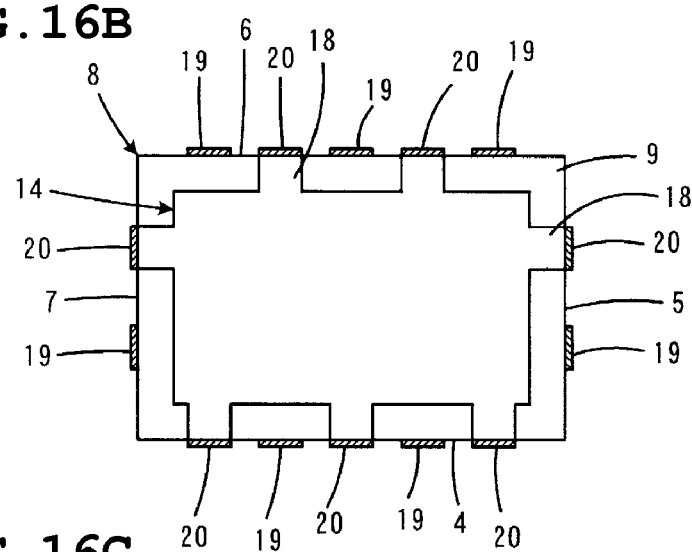
Figure 16C:
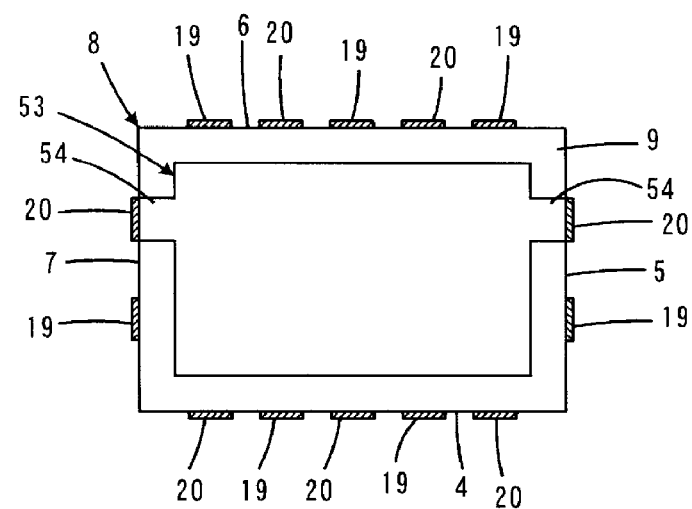

FIGS. 16A to 16C are diagrams for explaining a monolithic capacitor 1j according to an eleventh preferred embodiment of the present invention, corresponding to FIGS. 3A and 3B. In FIGS. 16A to 16C, elements corresponding to those shown in FIGS. 3A and 3B are designated by the same reference signs, and the description thereof is omitted.

FIGS. 16A and 16B show the first and second internal electrodes 13 and 14 shown in FIGS. 3A and 3B, respectively. FIG. 16C shows a dummy internal electrode 53. In this preferred embodiment, the dummy internal electrode 53 preferably has the same pattern as the fourth internal electrode shown in FIG. 4B. That is, the dummy internal electrode 53 includes lead-out portions 54 extended out to the shorter side surfaces 5 and 7 of the main capacitor unit 8, and the lead-out portions 54 are electrically connected to the second external terminal electrodes 20.

When the first internal electrode 13 shown in FIG. 16A and the second internal electrode 14 shown in FIG. 16B are laminated so as to oppose each other to define the first capacitor section 11 (refer to FIG. 2) as described earlier, at least one dummy internal electrode 53 is laminated adjacent to the second internal electrode 14 in the monolithic structure at an end and/or in the middle in the direction of lamination.

The dummy internal electrode 53 described above produces substantially the same operation and advantages as the dummy internal electrodes 45 and 49 shown in FIGS. 14A to 15C, respectively.

As a modification of the eleventh preferred embodiment, a dummy internal electrode having the same pattern as the third internal electrode 15 shown in FIG. 4A may be provided.

Figure 17A:
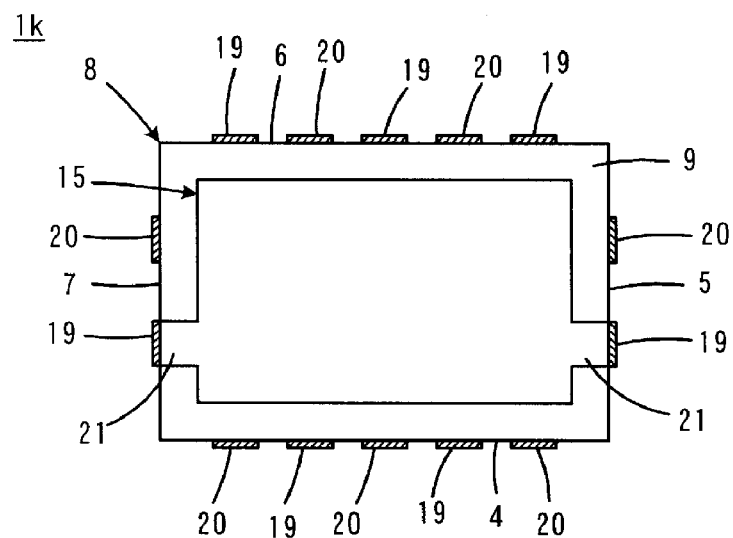
FIGS. 17A to 17C are diagrams for explaining a monolithic capacitor according to a twelfth preferred embodiment of the present invention, corresponding to FIGS. 4A and 4B.
Figure 17B:
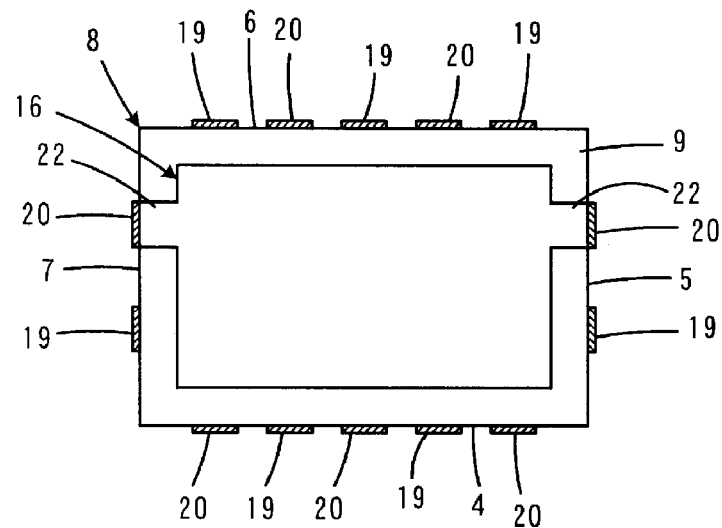
Figure 17C:
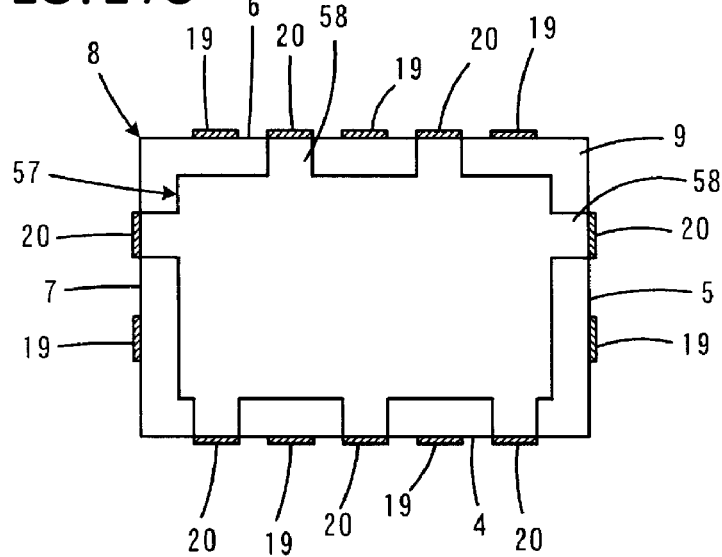

FIGS. 17A to 17C are diagrams for explaining a monolithic capacitor 1k according to a twelfth preferred embodiment of the present invention, corresponding to FIGS. 4A and 4B. In FIGS. 17A to 17C, elements corresponding to those shown in FIGS. 4A and 4B are designated by the same reference signs, and the description thereof is omitted.

FIGS. 17A and 17B show the third and fourth internal electrodes 15 and 16 shown in FIGS. 4A and 4B, respectively. FIG. 17C shows a dummy internal electrode 57. The dummy internal electrode 57 preferably has the same pattern as the second internal electrode 14 shown in FIG. 3B. That is, the dummy internal electrode 57 includes lead-out portions 58 extended out to the side surfaces 4 to 7 of the main capacitor unit 8, and the lead-out portions 58 are electrically connected to the second external terminal electrodes 20.

When the third internal electrode 15 shown in FIG. 17A and the fourth internal electrode 16 shown in FIG. 17B are laminated so as to oppose each other to define the second capacitor portion 12 (refer to FIG. 2) as described earlier, at least one dummy internal electrode 57 is laminated adjacent to the fourth internal electrode 16 in the monolithic structure at an end and/or in the middle in the direction of lamination.

The dummy internal electrode 57 described above produces substantially the same operation and advantages as the dummy internal electrodes 45, 49, and 53 shown in FIGS. 14A to 16C, respectively.

As a modification of the twelfth preferred embodiment, a dummy internal electrode preferably having substantially the same pattern as the first internal electrode 13 shown in FIG. 3B may be provided.

The ninth to twelfth preferred embodiments described above can be used in combination as appropriate. More specifically, since the ninth and eleventh preferred embodiments relate to the first capacitor portion 11 and the tenth and twelfth preferred embodiments relate to the second capacitor portion 12, each of the ninth and eleventh preferred embodiments can be used in arbitrary combination with each of the tenth and twelfth preferred embodiments.

FIGS. 18 to 21B show a monolithic capacitor 61 according to a thirteenth preferred embodiment of the present invention.

Figure 18:
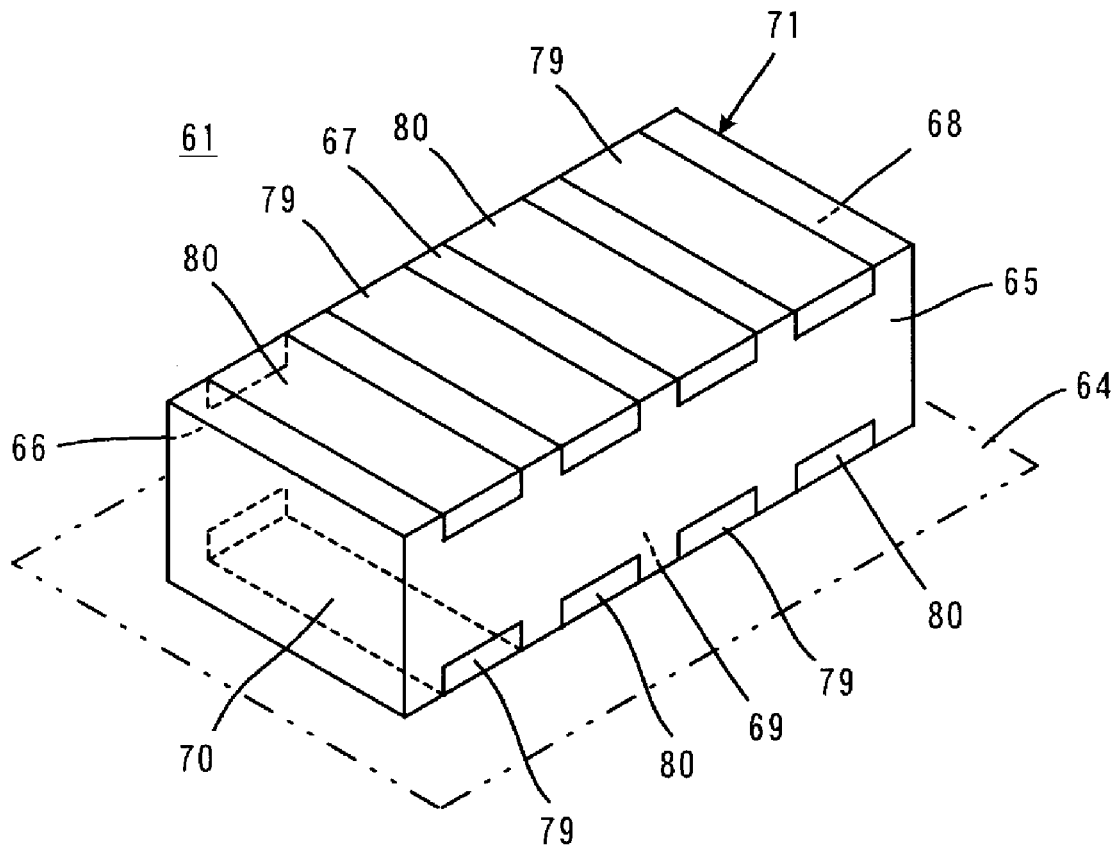
FIG. 18 is a perspective view showing the appearance of a monolithic capacitor according to a thirteenth preferred embodiment of the present invention.
Figure 19:
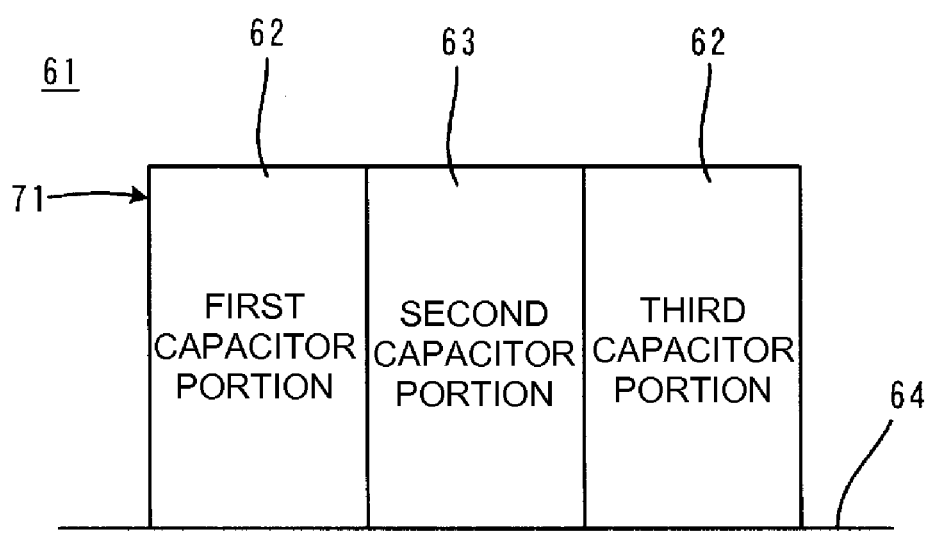
FIG. 19 is a side view illustrating how first and second capacitor portions are arranged in the monolithic capacitor shown in FIG. 18.

FIG. 18 shows a perspective view showing the appearance of the monolithic capacitor 61, and FIG. 19 shows a side view illustrating how first and second capacitor portions 62 and 63 are arranged in the monolithic capacitor 61. In FIGS. 18 and 19, a mounting surface 64 is shown. When mounted, the monolithic capacitor 61 has a direction of lamination that is parallel to the mounting surface 64.

The monolithic capacitor 61 includes a substantially rectangular main capacitor unit 71 having two opposing principal surfaces 65 and 66 and four side surfaces 67, 68, 69, and 70 connecting the principal surfaces 65 and 66. The main capacitor unit 71 has a monolithic structure including a lamination of a plurality of dielectric layers 72 (refer to FIGS. 20A, 20B, 21A, and 21B) substantially parallel to the principal surfaces 65 and 66, and composed of, for example, a dielectric ceramic material.

As shown in FIG. 19, the capacitor main unit 71 includes first capacitor portions 62 and a second capacitor portion 63. The first capacitor portions 62 and the second capacitor portion 63 are arrayed in the direction of lamination, which is substantially parallel to the mounting surface 64, with the second capacitor portion 63 sandwiched by the two first capacitor portions 62. Thus, the first capacitor portions 62 are located at end portions of the capacitor main unit 71.

Figure 20A:
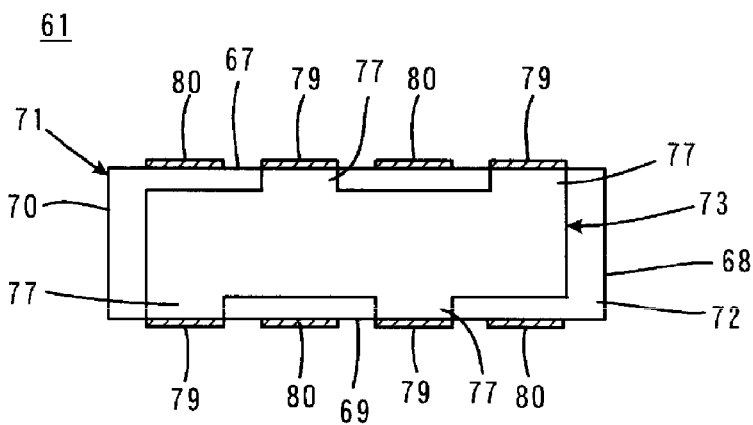
Figure 20B:
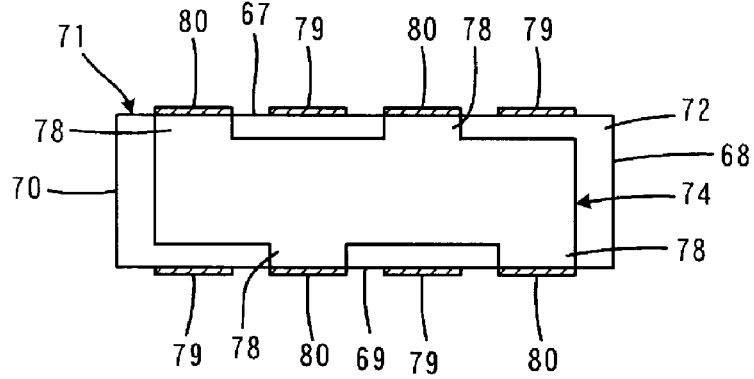
Figure 21A:
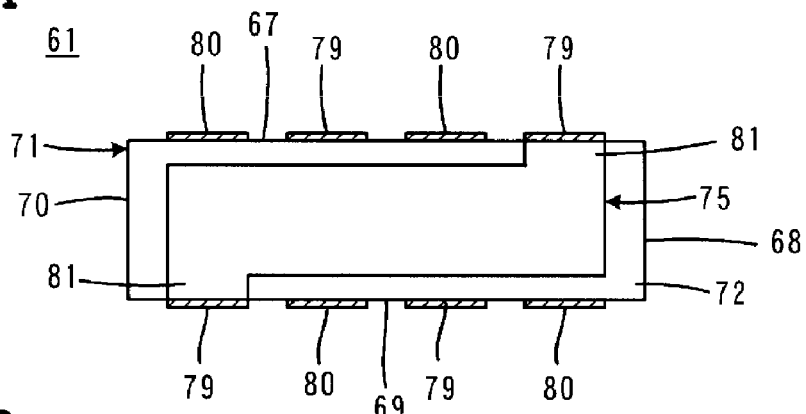
Figure 21B:
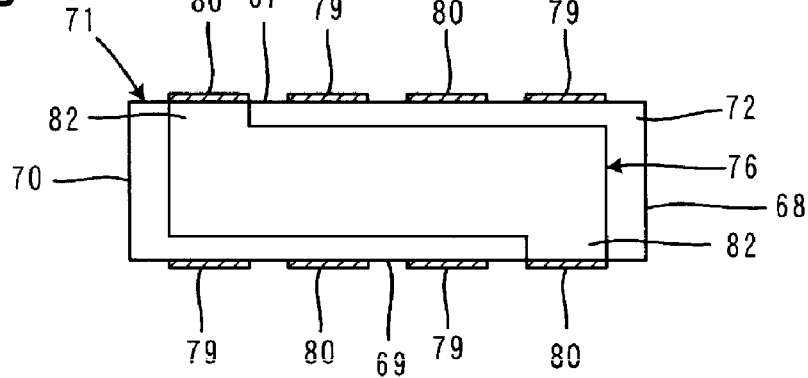

FIGS. 20A and 20B are plan views of the dielectric layers 72, showing the internal structure of the first capacitor portion 62, in which FIG. 20A shows a cross-section of a first internal electrode 73 and FIG. 20B shows a cross-section of a second internal electrode 74. FIGS. 21A and 21B are plan views of the dielectric layers 72, showing the internal structure of the second capacitor portion 63, in which FIG. 21A shows a cross-section of a third internal electrode 75 and FIG. 21B shows a cross-section of a fourth internal electrode 76.

As shown in FIGS. 20A and 20B, in the first capacitor portion 62, at least one pair of the first and second internal electrodes 73 and 74 oppose each other via a predetermined dielectric layer 72 so as to define a capacitor. Furthermore, as shown in FIGS. 21A and 21B, in the second capacitor portion 63, at least one pair of the third and fourth internal electrodes 75 and 76 oppose each other via a predetermined dielectric layer 72 so as to define a capacitor.

As shown in FIG. 20A, the first internal electrode 73 includes two first lead-out portions 77 extended out respectively to the two opposing side surfaces 67 and 69 of the main capacitor unit 71. Furthermore, as shown in FIG. 20B, the second internal electrode 74 includes two second lead-out portions 78 extended out respectively to the opposing side surfaces 67 and 69 of the main capacitor unit 71.

On each of the side surfaces 67 and 69 of the main capacitor unit 71, two first external terminal electrodes 79 electrically connected individually to the first lead-out portions 77 and two second external terminal electrodes 80 electrically connected individually to the second lead-out portions 78 are provided. The first and second external terminal electrodes 79 and 80 extend from the side surfaces 67 and 69 on to portions of the principal surfaces 65 and 66. Furthermore, the first external terminal electrodes 79 and the second external terminal electrodes 80 are alternately arranged on the side surfaces 67 and 69.

As shown in FIG. 21A, the third internal electrode 75 includes third lead-out portions 81 extended out to the opposing side surfaces 67 and 69 of the main capacitor unit 71, one for each of the side surfaces 67 and 69. Also, as shown in FIG. 21B, the fourth internal electrode 76 includes fourth lead-out portions 82 extended out from the opposing side surfaces 67 and 69 of the main capacitor unit 71, one for each of the side surfaces 67 and 69.

In this preferred embodiment, the third lead-out portions 81 are electrically connected to the first external terminal electrodes 79 described earlier, and the fourth lead-out portions 82 are electrically connected to the second external terminal electrodes 80 described earlier.

In the thirteenth preferred embodiment described above, similar to the first preferred embodiment, the number of pairs of the third and fourth lead-out portions 81 and 82 for one pair of the third and fourth internal electrodes 75 and 76 is less than the number of pairs of the first and second lead-out portions 77 and 78 for one pair of the first and second internal electrodes 73 and 74. More specifically, two pairs of the third and fourth lead-out portions 81 and 82 are provided for one pair of the third and fourth internal electrodes 75 and 76, and four pairs of the first and second lead-out portions 77 and 78 are provided for one pair of the first and second internal electrodes 73 and 74.

Furthermore, in the thirteenth preferred embodiment, the number of the third lead-out portions 81 for each of the third internal electrodes 75 and the number of the fourth lead-out portions 82 for each of the fourth internal electrodes 76 are less than the number of the first lead-out portions 77 for each of the first internal electrodes 73 and the number of the second lead-out portions 78 for each of the second internal electrodes 74.

Thus, currents flow in various directions in the first and second internal electrodes 73 and 74. Therefore, through canceling of magnetic fluxes, the ESL of the first capacitor portion 62 is less than the ESL of the second capacitor portion 63. On the other hand, in the third and fourth internal electrodes 75 and 76, currents flow in a smaller number of directions. Thus, assuming that other conditions such as the materials of the internal electrodes 73 to 76 are the same, the ESR of the second capacitor portion 63 is greater than the ESR of the first capacitor portion 62.

From another perspective, also in the thirteenth preferred embodiment, the number of the third lead-out portions 81 for each of the third internal electrodes 75 and the number of the fourth lead-out portions 82 for each of the fourth internal electrodes 76 are less than the number of the first lead-out portions 77 for each of the first internal electrodes 73 and the number of the second lead-out portions 78 for each of the second internal electrodes 74. Thus, assuming that other conditions such as the materials of the internal electrodes 73 to 76 are the same, the ESL of the first capacitor portion 62 is less than the ESL of the second capacitor portion 63. Accordingly, the resonant frequency of the first capacitor portion 62 is greater than the resonant frequency of the second capacitor portion 63.

At the same time, as described earlier, since the number of the third lead-out portions 81 and the number of the fourth lead-out portions 82 are less than the number of the first lead-out portions 77 and the number of the second lead-out portions 78, assuming that the effects of the internal electrodes 73 to 76 or the lead-out portions 77, 78, 81, and 82 on ESRs do not differ between the first capacitor portion 62 and the second capacitor portion 63, the ESR per layer provided by one pair of the third and fourth internal electrodes 75 and 76 and the intervening dielectric layer 72 included in the second capacitor portion 63 is greater than the ESR per layer provided by one pair of the first and second internal electrodes 73 and 74 and the intervening dielectric layer 72 included in the first capacitor portion 62.

From what has been described above, similarly to the monolithic capacitor 1 according to the first preferred embodiment, the monolithic capacitor 61 produces characteristics in which low ESL characteristics due to the first capacitor portions 62 and high ESR characteristics due to the second capacitor portion 63 are combined. Thus, both low ESL and high ESR are achieved with the monolithic capacitor 61.

Figure 22:
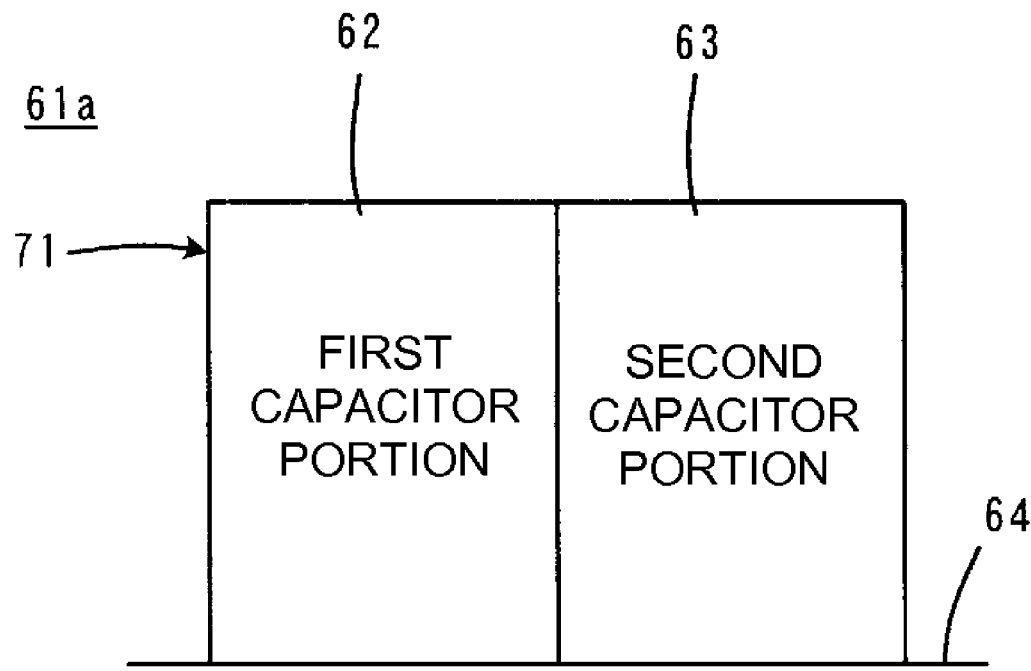
FIG. 22 is a diagram for explaining a monolithic capacitor according to a fourteenth preferred embodiment of the present invention, corresponding to FIG. 19.
Figure 23:
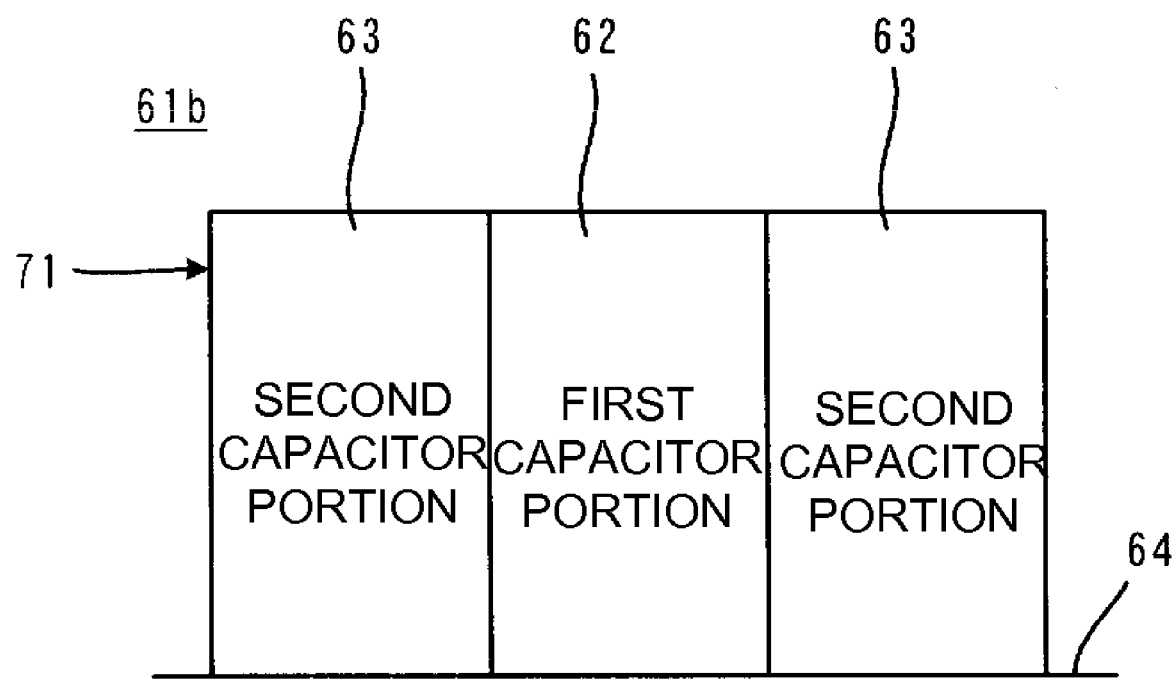
FIG. 23 is a diagram for explaining a monolithic capacitor according to a fifteenth preferred embodiment of the present invention, corresponding to FIG. 19.
Figure 24A:
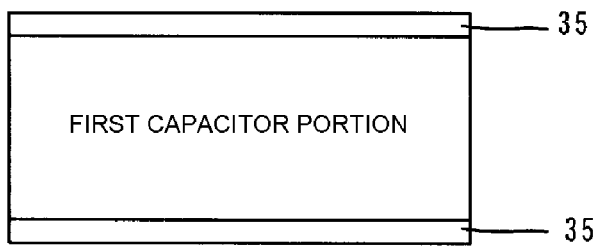
FIGS. 24A to 24E are diagrams illustrating some examples of how first and second capacitor portions are laminated and arranged in first and second experiments performed to confirm the advantages of the present invention.
Figure 24B:
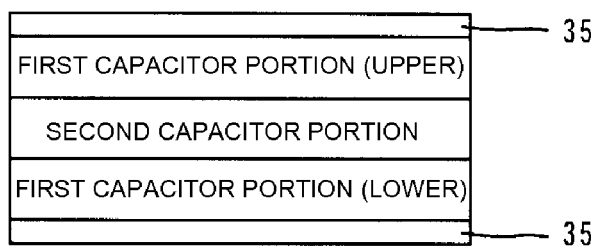
Figure 24C:
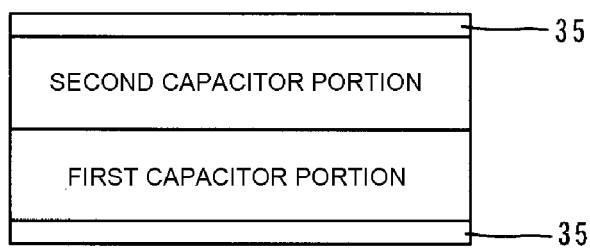
Figure 24D:
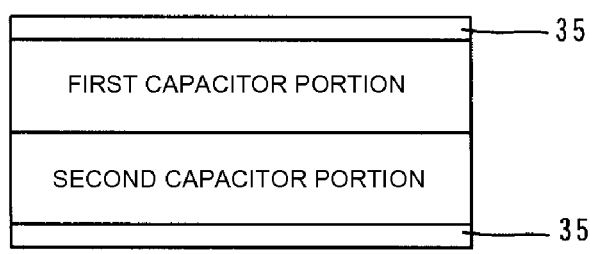
Figure 24E:
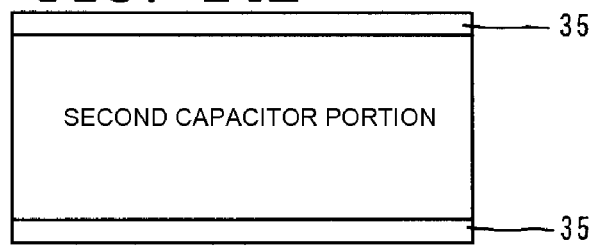

FIGS. 22 and 23 are diagrams for explaining monolithic capacitors 61*a* and 61*b* according to fourteenth and fifteenth preferred embodiments of the present invention, corresponding to FIG. 19. In FIGS. 22 and 23, elements corresponding to those shown in FIG. 19 are designated by the same reference signs, and repeated description thereof is omitted.

In the case of the monolithic capacitor 61 according to the thirteenth preferred embodiment described above, the dielectric layers 72 and the internal electrodes 73 to 76 is substantially perpendicular to the mounting surface 64, so that, in contrast to the monolithic capacitor 1 according to the first preferred embodiment, it is not necessary to consider the effects of the distance between the mounting surface 64 and the internal electrodes on ESLs. Thus, the first and second capacitor portions 62 and 63 may be arranged as shown in FIG. 22 or FIG. 23 instead of as shown in FIG. 19 without causing problems.

Although the present invention has been described in the context of the preferred embodiments shown in the drawings, various other modifications are possible within the scope of the present invention.

For example, the locations or the number of lead-out portions provided on internal electrodes or the locations or the number of external terminal electrodes may be changed.

Furthermore, the first and second capacitor portions in the main capacitor unit may be arranged in various manners other than those in the preferred embodiments shown in the drawings, as will be understood from experiments described later.

Furthermore, for example, in the first preferred embodiment, although the first and second internal electrodes 13 and 14 are provided only to define the first capacitor portions 11 and the third and fourth internal electrodes 15 and 16 are provided only to define the second capacitor portion 12 in the first preferred embodiment, an internal electrode located at a boundary between the first and second capacitor portions may be provided as an internal electrode for both the first and second capacitor portions, i.e., as an internal electrode that functions commonly as the first or second internal electrode and the third or fourth internal electrode.

Furthermore, for example, in the first preferred embodiment, although the number of the first lead-out portions 17 and the number of the second lead-out portions 18 (or the number of pairs thereof) are preferably selected to be greater than the number of the third lead-out portions 21 and the number of the fourth lead-out portions 22 (or the number of pairs thereof) so that the resonant frequency of the first capacitor portion 11 is greater than the resonant frequency of the second capacitor portion 12, alternatively or in addition, the materials or patterns of the internal electrodes 13 to 16 and/or the number of laminated layers may be changed.

Furthermore, for example, in the first preferred embodiment, although the number of the third lead-out portions 21 and the number of the fourth lead-out portions 22 are preferably selected to be less than the number of the first lead-out portions 17 and the number of the second lead-out portions 18 so that the ESR per layer in the second capacitor portion 12 is greater than the ESR per layer in the first capacitor portion 11, alternatively or in addition, a material having a greater resistivity may be selected for the third internal electrodes 15 and/or the fourth internal electrodes 16, the thickness of the third internal electrodes 15 and/or the fourth internal electrodes may be decreased, or the width or thickness of the third lead-out portions 21 and/or the fourth lead-out portions 22 may decreased.

Next, experiments that were performed to confirm the advantages of various preferred embodiments of the present invention will be described.

1. First Experiment

In this experiment, using known techniques, a plurality of ceramic green sheets is prepared, internal electrodes having lead-out portions were formed on specific ceramic green sheets by printing conductive paste, the plurality of ceramic green sheets including the ceramic green sheets having the internal electrodes formed thereon was laminated and the resulting lamination was fired to obtain a main capacitor unit, and external terminal electrodes were formed on the outer surface of the main capacitor unit by baking conductive paste. Through these steps, monolithic capacitors of the samples shown in Table 1 were manufactured.

In each of the monolithic capacitors of the samples, the dimensions of the main capacitor unit were 2.0 mm×1.25 mm×0.5 mm, the total number of laminated layers of internal electrodes was 64, the capacitance was 0.68 µF, and as the preferred embodiment shown in FIG. 1 and other figures, the number of external terminal electrodes was 14. Furthermore, the thickness of the internal electrodes was 1 µm, the thickness of lead-out portions was 1 µm, and the width of the lead-out portions was 150 µm.

tion" of sample 13 indicate that internal electrode patterns shown in FIGS. 25, 26, 27, 28, and 29 are used, respectively.

Figure 25A:
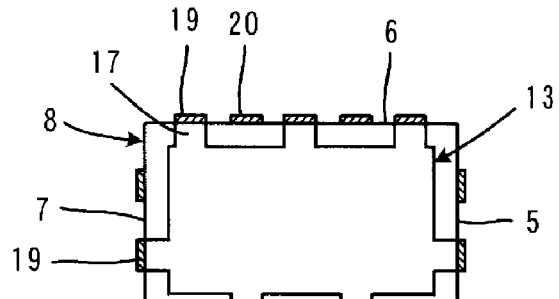
FIGS. 25A and 25B are plan views showing patterns of internal electrodes in the first capacitor portion of sample 11 manufactured in the first experiment.
Figure 25B:
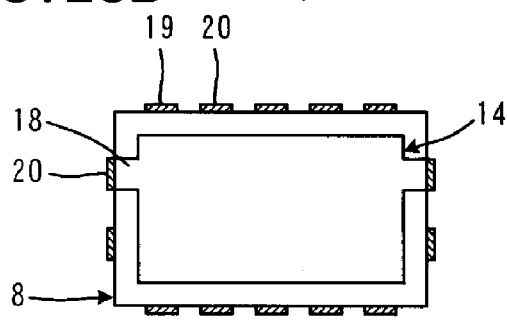

FIG. 25A shows a first internal electrode 13 having seven first lead-out portions 17, and FIG. 25B shows a second internal electrode 14 having two second lead-out portions 18.

Figure 26A:
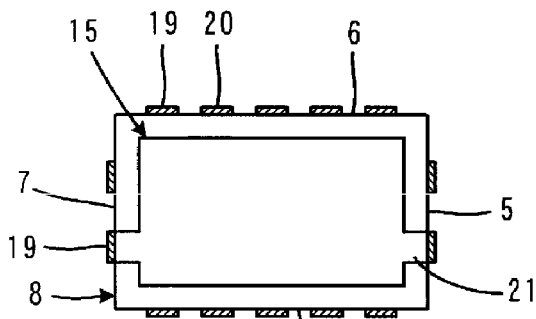
FIGS. 26A and 26B are plan views showing patterns of internal electrodes in the second capacitor portion of sample 11 manufactured in the first experiment.
Figure 26B:
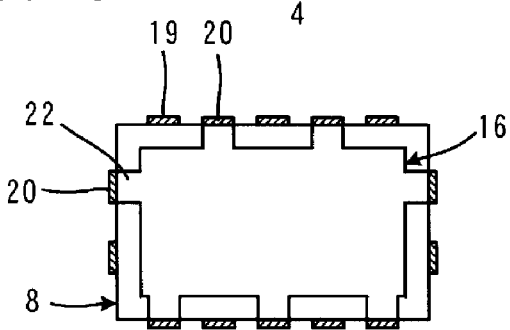

FIG. 26A shows a third internal electrode 15 having two third lead-out portions 21, and FIG. 26B shows a fourth internal electrode 16 having seven fourth lead-out portions 22.

Figure 27:
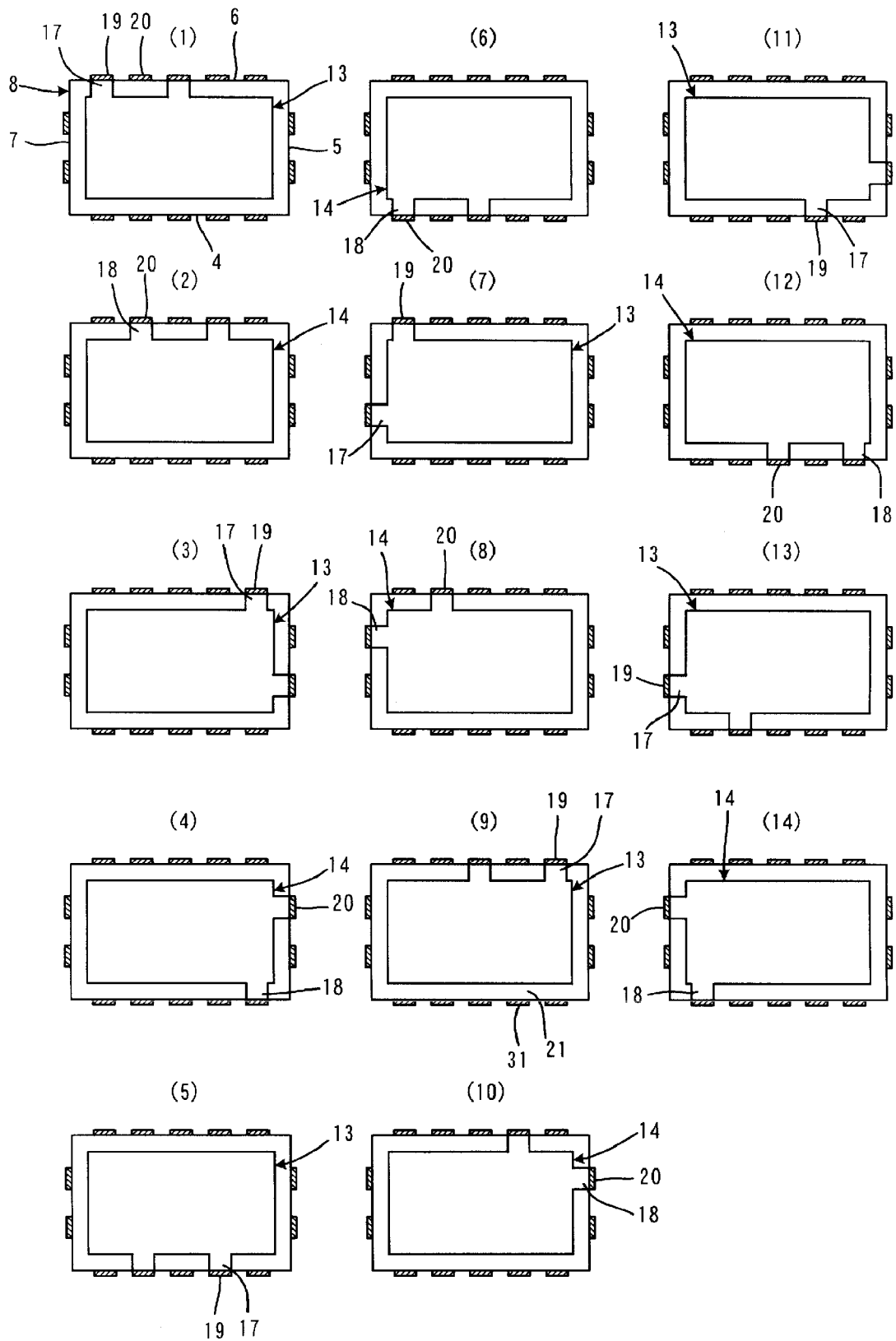
FIG. 27 shows plan views showing patterns of internal electrodes in the first capacitor portion of sample 12 manufactured in the first experiment.

FIG. 27 shows a first internal electrode 13 having two first lead-out portions 17 and a second internal electrode 14 having two second lead-out portions 18. In FIG. 27, (1) to (14) represent the orders of lamination.

TABLE 1

Figure 28:
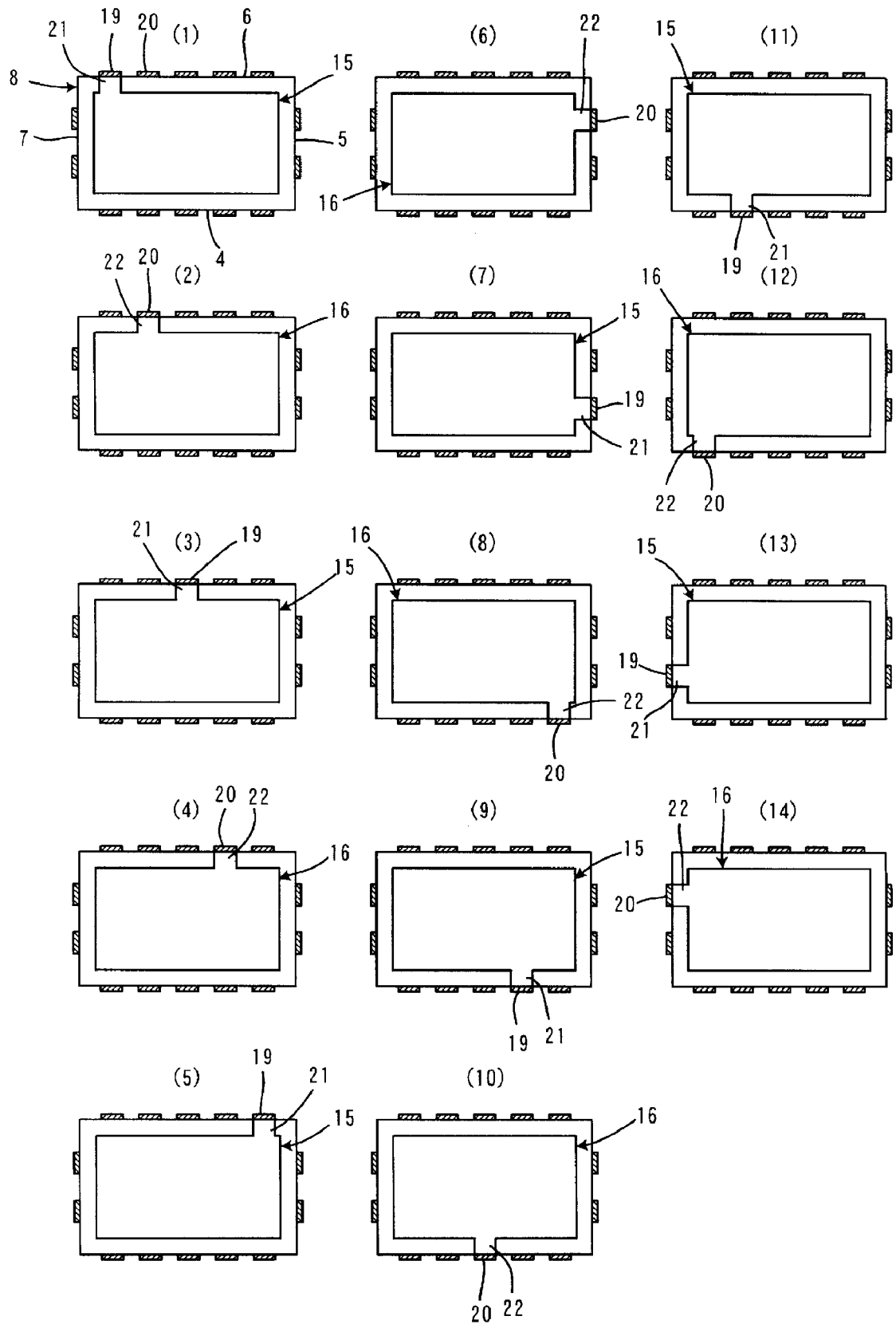
FIG. 28 shows plan views showing patterns of internal electrodes in the second capacitor portion of sample 12 manufactured in the first experiment.
Figure 29:
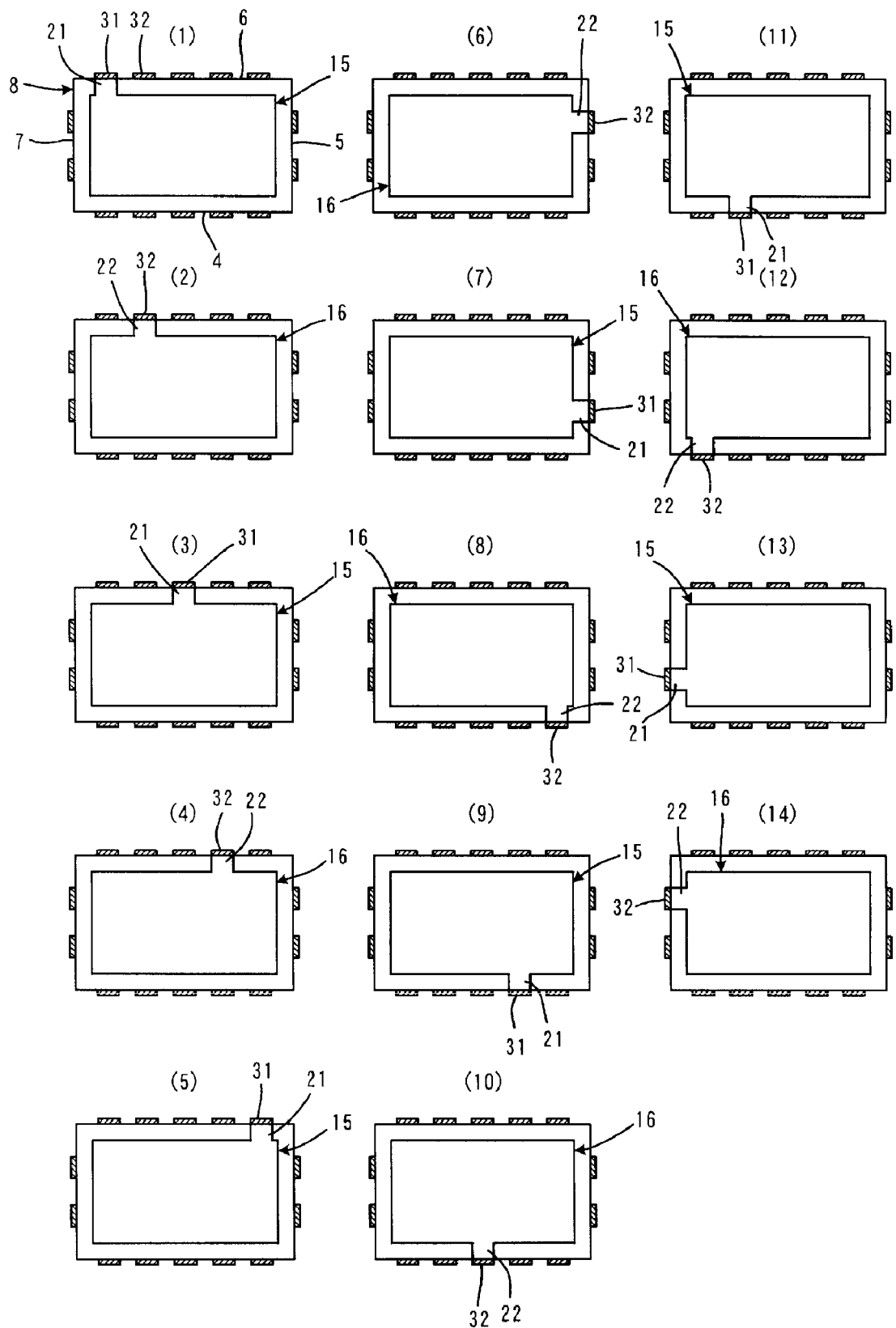
FIG. 29 shows plan views showing patterns of internal electrodes in the second capacitor portion in samples 13 and 29 manufactured in the first and second experiments, respectively.

| Sample No. | Manner of lamination and arrangement | First capacitor portion | | | | | Second capacitor portion | | | | |
|---|---|---|---|---|---|---|---|---|---|---|---|
| | | Internal electrode pattern | Number of laminated layers | Number of first lead-out portions | Number of second lead-out portions | Number of pairs of lead-out portions | Internal electrode pattern | Number of laminated layers | Number of third lead-out portion | Number of fourth lead-out portion | Number of pair of lead-out portions |
| *1 | A | FIG. 3 | 64 | 7 | 7 | 7 | — | — | — | — | — |
| 2 | B | FIG. 3 | Upper 20  Lower 20 | 7 | 7 | 7 | FIG. 4 | 24 | 2 | 2 | 2 |
| 3 | B | FIG. 3 | Upper 10  Lower 10 | 7 | 7 | 7 | FIG. 4 | 44 | 2 | 2 | 2 |
| 4 | B | FIG. 3 | Upper 6  Lower 6 | 7 | 7 | 7 | FIG. 4 | 52 | 2 | 2 | 2 |
| 5 | B | FIG. 3 | Upper 4  Lower 4 | 7 | 7 | 7 | FIG. 4 | 56 | 2 | 2 | 2 |
| 6 | C | FIG. 3 | 32 | 7 | 7 | 7 | FIG. 7 | 32 | 1 | 1 | 1 |
| 7 | C | FIG. 3 | 24 | 7 | 7 | 7 | FIG. 7 | 40 | 1 | 1 | 1 |
| 8 | C | FIG. 3 | 16 | 7 | 7 | 7 | FIG. 7 | 48 | 1 | 1 | 1 |
| 9 | C | FIG. 3 | 8 | 7 | 7 | 7 | FIG. 7 | 56 | 1 | 1 | 1 |
| 10 | D | FIG. 3 | 8 | 7 | 7 | 7 | FIG. 7 | 56 | 1 | 1 | 1 |
| *11 | C | FIG. 25 | 8 | 7 | 2 | 2 | FIG. 26 | 56 | 2 | 7 | 2 |
| 12 | C | FIG. 27 | 8 | 2 | 2 | 2 | FIG. 28 | 56 | 1 | 1 | 1 |
| *13 | E | — | — | — | — | — | FIG. 29 | 64 | 1 | 1 | 1 |

In Table 1, A to E shown in the section of "Manner of lamination and arrangement" correspond to FIG. 24, respectively. FIGS. 24A to 24E show how the first and second capacitor portions are arranged in the direction of lamination. In FIGS. 24A to 24E, parts designated by reference signs "35" indicate external layers on which no internal electrodes are provided. Furthermore, in FIGS. 24A to 24E, bottom surfaces of lamination structures that are shown face the mounting surface.

In the section of "First capacitor portion" in Table 1, "Internal electrode pattern", "Number of laminated layers", "Number of first lead-out portions", "Number of second lead-out portions", and "Number of pairs of lead-out portions" are shown. In the section of "Second capacitor portion", "Internal electrode pattern", "Number of laminated layers", "Number of third lead-out portion", "Number of fourth lead-out portion", and "Number of pair of lead-out portions" are shown.

In each field of "Internal electrode pattern", the number of the figure showing the internal electrode pattern adopted in each sample is cited. "FIG. 25" cited in the field of "Internal electrode pattern" in the "First capacitor portion" of sample 11, "FIG. 26" cited in the field of "Internal electrode pattern" in the "Second capacitor portion" of sample 11, "FIG. 27" cited in the field of "Internal electrode pattern" in the "First capacitor portion" of sample 12, "FIG. 28" cited in the field of "Internal electrode pattern" in the "Second capacitor portion" of sample 12, and "FIG. 29" cited in the field of "Internal electrode pattern" in the "Second capacitor por- FIG. 28 shows a third internal electrode 15 having one third lead-out portion 21 and a fourth internal electrode 16 having one fourth lead-out portion 22. In FIG. 28, (1) to (14) represent the orders of lamination.

FIG. 29 shows a third internal electrode 15 having one third lead-out portion 21 and a fourth internal electrode 16 having one fourth lead-out portion 22, and external terminal electrodes 31 and 32 electrically connected to the third and fourth lead-out portions 21 and 22, respectively. In FIG. 29, (1) to (14) represent the orders of lamination.

Referring back to Table 1, "Number of laminated layers" represents a total number of laminated layers of the first and second internal electrodes in "First capacitor portion", and represents a total number of laminated layers of the third and fourth internal electrodes in "Second capacitor portion". The indication of "Upper" and "Lower" in the section of "Number of laminated layers" in "First capacitor portion" correspond to "first capacitor portion (upper)" and "first capacitor portion (lower)" in FIG. 24(b), respectively.

Furthermore, "Number of first lead-out portions", "Number of second lead-out portions", and "Number of pairs of lead-out portions" in "First capacitor portion" represent the number of lead-out portions for one first internal electrode, the number of lead-out portions for one second internal electrode, and the number of pairs of the first and second lead-out portions for one pair of the first and second internal electrodes.

On the other hand, "Number of third lead-out portion", "Number of fourth lead-out portion", and "Number of pair of lead-out portions" in "Second capacitor portion" represent the number of lead-out portion for one third internal electrode, the number of lead-out portion for one fourth internal electrode, and the number of pair of the third and fourth lead-out portions for one pair of the first and second internal electrodes.

Table 2 shows "ESL value" and "ESR value" obtained from each of samples 1 to 13 designed as shown in Table 1.

TABLE 2

| Sample No. | ESL value | ESR value |
|---|---|---|
| *1 | 35 pH | 6.8 mΩ |
| 2 | 35 pH | 12.3 mΩ |
| 3 | 36 pH | 30.1 mΩ |
| 4 | 36 pH | 31.1 mΩ |
| 5 | 37 pH | 32.3 mΩ |
| 6 | 36 pH | 14.7 mΩ |
| 7 | 38 pH | 18.7 mΩ |
| 8 | 37 pH | 28.1 mΩ |
| 9 | 36 pH | 37.2 mΩ |
| 10 | 45 pH | 38.1 mΩ |
| *11 | 46 pH | 13.3 mΩ |
| 12 | 46 pH | 29.1 mΩ |
| *13 | 48 pH | 34.4 mΩ |

In Table 1 and Table 2, sample numbers with * represent comparative examples that are not within the scope of the present invention.

In sample 1 as a comparative example, as shown in Table 1, the second capacitor portion, which contributes to increasing ESR, is not provided. Thus, as shown in Table 2, although ESL is decreased, it is not possible to increase ESR.

In sample 9 as a comparative example contrasted with sample 1, as shown in Table 1, the first capacitor portion, which contributes to decreasing ESL, is not provided. Thus, as shown in Table 2, although ESR is increased, it is not possible to decrease ESL.

In sample 11 as a comparative example, as shown in Table 1, "Number of pairs of lead-out portions" in "Second capacitor portion" is equal to "Number of pairs of lead-out portions" in "First capacitor portion", so that the first capacitor portion and the second capacitor portion have the same configuration. Thus, the ESL value is approximately 46 pH, which is substantially the same as that of sample 12, which has the smallest number of lead-out portions among the preferred embodiments of the present invention, and the ESR value is approximately 13.3 mΩ, which is substantially the same as that of sample 2 having the lowest ESR value among the preferred embodiments of the present invention. This occurs for the following reasons.

The ESL value is substantially the same as that of sample 12 since the number of pairs of lead-out portions in the first capacitor portion and the number of pairs of lead-out portions in the second capacitor portions are two. This is because, although the number of the first lead-out portions is seven, the number of pairs is only two.

As for ESR, since the number of internal electrodes in the first capacitor portions and the second capacitor portion are increased, the ESR per layer is considerably less than that of sample 13. Furthermore, by lamination of layers, ESRs are connected in parallel, so that the ESR is further decreased.

As described above, when the first capacitor portion and the second capacitor portion have the same configuration, it is not possible to effectively increase ESR.

Furthermore, in addition to the improvement in high-frequency characteristics, in samples 2 to 10 and 12, as preferred embodiments within the scope of the present invention, as shown in Table 1, both the first and second capacitor portions are provided, and "Number of pair of lead-out portions" in "Second capacitor portion" is less than "Number of pairs of lead-out portions" in "First capacitor portion". Thus, as shown in Table 2, ESL is decreased and ESR is increased at the same time.

Furthermore, in samples 2 to 9, the ESL value is substantially the same as that in sample 1. This is because, at high frequencies, electric fields concentrate on the side of the mounting surface, and the characteristics regarding the loop indicated by the broken arrow 28 in FIG. 2 are most strongly affected, so that the low ESL value of the first capacitor portion becomes dominant in samples 2 to 9, in which the first capacitor portion having a greater number of lead-out portions is laminated and arranged on the side of the mounting surface.

In contrast, in sample 10, in which the second capacitor portion is located on the side of the mounting surface, the ESL value is greater as compared to samples 2 to 9. Even in the configuration of sample 10, the ESL value is less compared to sample 13 due to the presence of the first capacitor portion.

In samples 2 to 5, in which the number of laminated layers in the first capacitor portion is varied in the same manner of lamination and arrangement, the ESL values are substantially the same. Thus, it is understood that the effect of the number of laminated layers in the first capacitor portion on the ESL value is small. This also applies to samples 6 to 9 having a manner of lamination and arrangement different from that in samples 2 to 5.

As for the ESR value, the ESR value increases as the number of laminated layers in the second capacitor portion increases relative to the total number of laminated layers in the entire monolithic capacitor. Furthermore, from comparison among samples 5, 9, 10, and 12 in which the number of laminated layers in the second capacitor portion is the same, the ESR value is higher in samples 9, 10, and 12, in which the number of the third lead-out portions and the number of the fourth-lead out portions are one, as compared to sample 5, in which the number of the third lead-out portions and the number of the fourth lead-out portions are two. Furthermore, in samples 9 and 10, the ESR value is higher compared to sample 13. This is because the ESR value of the first capacitor portion and the ESR value of the second capacitor portion are both higher than in sample 13, and as a result, the resonant frequency differs between the first capacitor portion and the second capacitor portion, so that the ESR value of the monolithic capacitor is greater than that in sample 13.

When samples 9 and 10 are compared, the ESR values are substantially the same. Thus, it is understood that the ESR value has a tendency to remain substantially the same when the number of laminated layers in the second capacitor portion is the same even if the manner of lamination and arrangement differs.

2. Second Experiment

In this experiment, through the same steps as in the first experiment, monolithic capacitors of samples shown in Table 3 were manufactured.

Similarly to the first experiment, in each of the monolithic capacitors of the samples, the dimensions of the main capacitor unit were 2.0 mm×1.25 mm×0.5 mm, the total number of laminated layers of internal electrodes was 64, the capacitance was 0.68 μF, and similarly to the embodiment shown in FIG. 1 and other figures, the number of external terminal electrodes was 14. Furthermore, the thickness of the internal electrodes was 1 μm, the thickness of lead-out portions was 1 μm, and the width of the lead-out portions was 100 μm.

TABLE 3

| Sample No. | Manner of lamination and arrangement | First capacitor portion | | | | Second capacitor portion | | | | Number of first lead-out portions | Number of second lead-out portions | Number of third lead-out portions | Number of fourth lead-out portions |
|---|---|---|---|---|---|---|---|---|---|---|---|---|---|
| | | Internal electrode pattern | Number of laminated layers | Resonant frequency [MHz] | ESR per layer [mΩ] | Internal electrode pattern | Number of laminated layers | Resonant frequency [MHz] | ESR per layer [mΩ] | | | | |
| *21 | A | FIG. 3 | 64 | 32.8 | 164 | — | — | — | — | 7 | 7 | — | — |
| 22 | B | FIG. 3 | Upper 20 Lower 20 | 38.1 | 163 | FIG. 4 | 24 | 26.9 | 577 | 7 | 7 | 2 | 2 |
| 23 | B | FIG. 3 | Upper 10 Lower 10 | 54.6 | 170 | FIG. 4 | 44 | 19.7 | 562 | 7 | 7 | 2 | 2 |
| 24 | B | FIG. 3 | Upper 6 Lower 6 | 71.7 | 162 | FIG. 4 | 52 | 18.1 | 571 | 7 | 7 | 2 | 2 |
| 25 | B | FIG. 3 | Upper 4 Lower 4 | 89.9 | 163 | FIG. 4 | 56 | 17.4 | 574 | 7 | 7 | 2 | 2 |
| 26 | C | FIG. 3 | 32 | 42.7 | 158 | FIG. 7 | 32 | 23.2 | 1140 | 7 | 7 | 1 | 1 |
| 27 | C | FIG. 3 | 8 | 89.9 | 165 | FIG. 7 | 56 | 17.4 | 1151 | 7 | 7 | 1 | 1 |
| 28 | D | FIG. 3 | 8 | 89.5 | 161 | FIG. 7 | 56 | 16.4 | 1150 | 7 | 7 | 1 | 1 |
| *29 | E | — | — | — | — | FIG. 29 | 64 | 16 | 1155 | — | — | 1 | 1 |

In Table 3, A to E shown in the section of "Manner of lamination and arrangement" correspond to FIGS. 24A to 24E described earlier, respectively.

In each of the sections of "First capacitor portion" and "Second capacitor portion" in Table 3, "Internal electrode pattern", "Number of laminated layers", "Resonant frequency", and "ESR per layer" are shown.

The ESR of the capacitor can be expressed by the following equation:

$$\text{ESR of capacitor} = R(4N-2)/N^2$$

where R denotes the resistance per electrode layer and N denotes the number of laminated layers. The resistance R per electrode layer is herein calculated by an inverse calculation using the ESR of the entire first capacitor portion as the ESR of the capacitor, and "ESR per layer" is calculated by assigning the value of R and N=2 (since one layer of capacitor is formed of two opposing internal electrodes) into the above equation.

In each field of "Internal electrode pattern", the number of the drawing showing the internal electrode pattern adopted in each sample is cited.

Referring back to Table 3, "Number of laminated layers" represents the total Number of laminated layers of the first and second internal electrodes in "First capacitor portion", and represents a total Number of laminated layers of the third and fourth internal electrodes in "Second capacitor portion". The indication of "Upper" and "Lower" in the section of "Number of lamination" in "First capacitor portion" correspond to "first capacitor portion (upper)" and "first capacitor portion (lower)" in FIG. 24B, respectively.

Furthermore, each of "Number of first lead-out portions", "Number of second lead-out portions", "Number of third lead-out portions", and "Number of fourth lead-out portions" represents the number of lead-out portions for each relevant internal electrode.

Table 4 shows "ESL value" and "ESR value" obtained from each of samples 21 to 29 designed as shown in FIG. 3.

TABLE 4

| Sample No. | ESL value | ESR value |
|---|---|---|
| *21 | 35 pH | 6.8 mΩ |
| 22 | 35 pH | 12.3 mΩ |
| 23 | 36 pH | 30.1 mΩ |
| 24 | 36 pH | 31.1 mΩ |
| 25 | 37 pH | 32.3 mΩ |
| 26 | 36 pH | 16.1 mΩ |
| 27 | 36 pH | 37.2 mΩ |
| 28 | 43 pH | 38.1 mΩ |
| *29 | 48 pH | 36.7 mΩ |

In Table 3 and Table 4, sample numbers with * represent comparative examples that are not within the scope of the present invention.

In sample 21 as a comparative example, as shown in Table 3, the second capacitor portion, which contributes to increasing ESR, is not provided. Thus, as shown in Table 4, although ESL is decreased, it is not possible to increase ESR.

In sample 29 as another comparative example, as shown in Table 3, the first capacitor portion, which contributes to decreasing the ESL, is not provided. Thus, as shown in Table 4, although ESR is increased, it is not possible to decrease ESL.

In contrast, in samples 22 to 28 as preferred embodiments that are within the scope of the present invention, as shown in Table 3, both the first and second capacitor portions are provided. Thus, as shown in Table 4, ESL is decreased and ESR is increased at the same time.

As for samples 22 to 27, the ESL value is substantially the same as that in sample 21. This is because, at high frequencies, electric fields concentrate on the side of the mounting surface, and the characteristics regarding the loop indicated by the broken arrow 28 in FIG. 2 are affected most strongly, so that the low ESL value of the first capacitor portion becomes dominant in samples 22 to 27, in which the first capacitor portion having a greater number of lead-out portions is laminated and arranged on the side of the mounting surface.

In contrast, in sample 28, in which the second capacitor portion is located on the side of the mounting surface, the ESL value is higher as compared to samples 22 to 27. Even in the configuration of sample 28, the ESL value is lower compared to sample 29 due to the presence of the first capacitor portion.

In samples 22 to 25, in which the number of laminated layers in the first capacitor portion is varied under the same manner of lamination and arrangement, the ESL values are substantially the same. Thus, it is understood that the effect of the number of laminated layers in the first capacitor portion on the ESL value is small.

As for the ESR value, the ESR value increases as the number of laminated layers in the second capacitor portion increases relative to the total number of laminated layers in the entire monolithic capacitor. Furthermore, from comparison among samples 25, 27, and 28 in which the number of laminated layers in the second capacitor portion is the same, the ESR value is higher in samples 27 and 28, in which the number of the third lead-out portions and the number of the fourth-lead out portions are one, compared to sample 25, in which the number of the third lead-out portions and the number of the fourth lead-out portions are two. Furthermore, in samples 27 and 28, the ESR value is higher compared to sample 29. This is because the ESR value of the first capacitor portion and the ESR value of the second capacitor portion are both greater than in sample 29, and as a result, the resonant frequency differs between the first capacitor portion and the second capacitor portion, so that the ESR value of the monolithic capacitor is greater than that in sample 29.

When samples 27 and 28 are compared, the ESR values are substantially the same. Thus, it is understood that the ESR value has a tendency of remaining substantially the same when the number of laminated layers in the second capacitor portion is the same, even if the manner of lamination and arrangement differs.

Furthermore, when the samples 22 to 28 are compared, the resonant frequency tends to decrease as the number of laminated layers in the first and second capacitor portions increases. Furthermore, as will be understood from the resonant frequency of the first capacitor portions in samples 25, 27, and 28, the resonant frequency remains substantially the same when the number of laminated layers is the same, even if the manner of lamination and arrangement differs.

Furthermore, in samples 22 to 27, the resonant frequency of the first capacitor portion is selected to be greater than the resonant frequency of the second capacitor portion. For example, in sample 22, the total number of laminated layers is 40 and the resonant frequency is approximately 38 MHz in the first capacitor portion, and the number of laminated layers is 24 and the resonant frequency is approximately 26 MHz in the second capacitor portion. Even though the number of laminated layers is less in the second capacitor portion, the resonant frequency is less than in the first capacitor portion. This is due to the difference in the number of lead-out portions. When the number of laminated layers in the first capacitor portion is increased and the number of laminated layers in the second capacitor portion is decreased in sample 22, the difference between the resonant frequencies of the first and second capacitor portions decreases, and eventually the resonant frequencies become the same. At this time, when the resonant frequencies of the first and second capacitor portions are the same, it is assumed that the ESRs of the first and second capacitor portions are parallel, so that ESR decreases. Thus, it is not possible to achieve a desired high ESR.

From what has been described above, the resonant frequency of the first capacitor portion is preferably chosen to be greater than the resonant frequency of the second capacitor portion.

Figure 30:
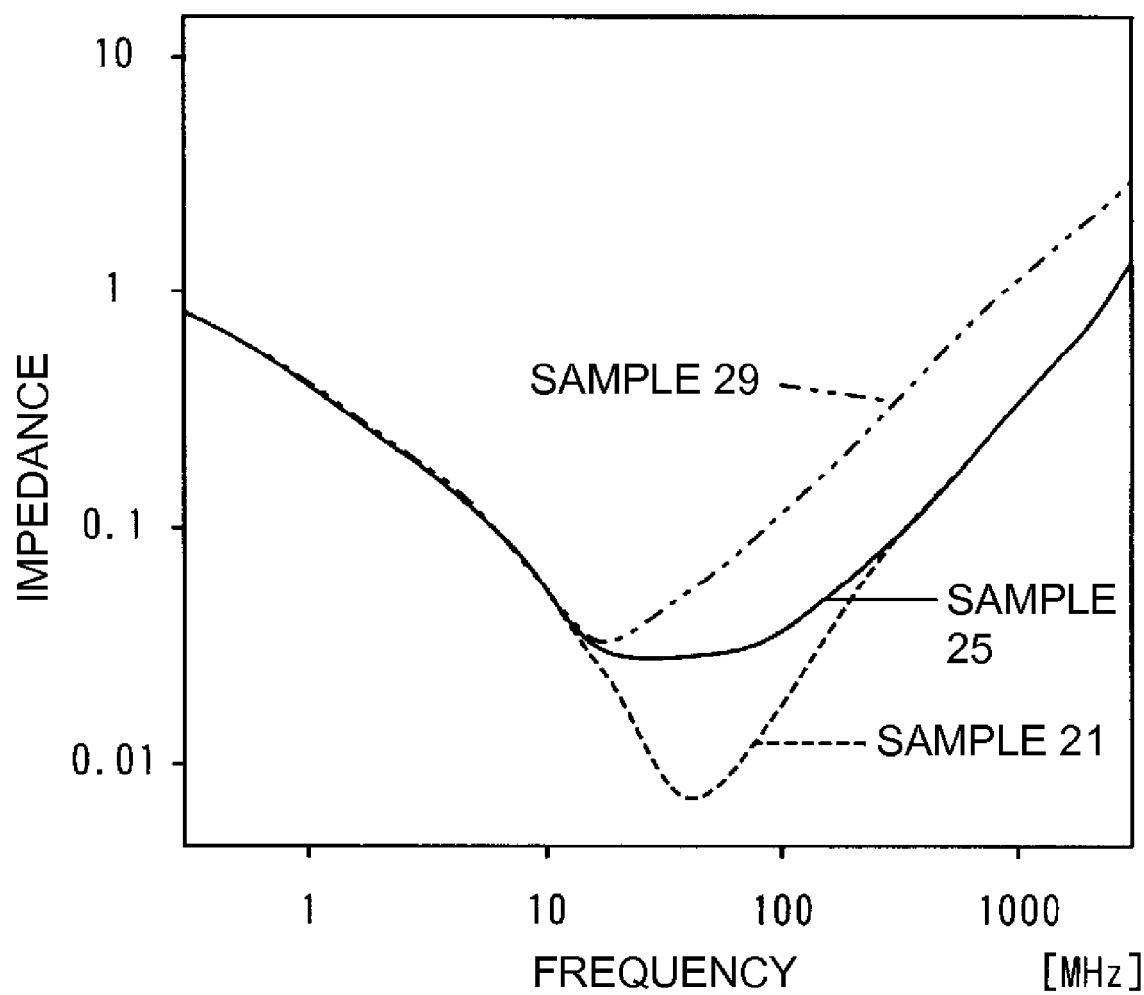
FIG. 30 is a diagram showing frequency-impedance characteristics of samples 21, 25, and 29 produced in experiment 2.

FIG. 30 shows frequency-impedance characteristics of sample 25 as a preferred embodiment and samples 21 and 29 as comparative examples, shown in Tables 3 and 4.

Referring to FIG. 30, in sample 21, as shown in Table 4, the ESR value decreases as the ESL value decreases, so that the impedance characteristics are steep.

In sample 29, as shown in Table 4, although the ESR value is increased, ESL value also increases, so that the impedance characteristics at high frequencies are degraded.

In contrast, in sample 25, as shown in Table 4, ESL is decreased and ESR is increased, so that favorable characteristics are obtained, even at high frequencies.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A monolithic capacitor comprising:
    a main capacitor unit having a monolithic structure including a lamination of a plurality of dielectric layers; wherein
    the main capacitor unit includes first and second capacitor portions;
    the first capacitor portion includes at least one pair of first and second internal electrodes opposing each other via a predetermined one of the dielectric layers so as to define a capacitance;
    the first internal electrode includes a plurality of first lead-out portions extending out to an outer surface of the main capacitor unit, and the second internal electrode includes a plurality of second lead-out portions extending out to the outer surface of the main capacitor unit;
    the second capacitor portion includes at least one pair of third and fourth internal electrodes opposing each other via a predetermined one of the dielectric layers so as to define a capacitance;
    the third internal electrode includes at least one third lead-out portion extending out to the outer surface of the main capacitor unit, and the fourth internal electrode includes at least one fourth lead-out portion extending out to the outer surface of the main capacitor unit;
    first, second, third, and fourth external terminal electrodes electrically connected individually to the first, second, third, and fourth lead-out portions are provided on the outer surface of the main capacitor unit; and
    the number of pairs of the third and fourth lead-out portions for one pair of the third and fourth internal electrodes is less than the number of pairs of the first and second lead-out portions for one pair of the first and second internal electrodes.

2. The monolithic capacitor according to claim 1, wherein at least one of the number of the third lead-out portions for each of the third internal electrodes and the number of the fourth lead-out portions for each of the fourth internal electrodes is less than the number of the first lead-out portions for each of the first internal electrodes and the number of the second lead-out portions for each of the second internal electrodes.

3. The monolithic capacitor according to claim 2, wherein one of the third internal electrode and the fourth internal electrode has substantially the same pattern as one of the first internal electrode and the second internal electrode.

4. The monolithic capacitor according to claim 1, wherein the number of the third lead-out portions for each of the third internal electrodes and the number of the fourth lead-out portions for each of the fourth internal electrodes are less than the number of the first lead-out portions for each of the first internal electrodes and the number of the second lead-out portions for each of the second internal electrodes.

5. The monolithic capacitor according to claim 1, wherein at least one of the first and second external terminal electrodes defines at least one of the third and fourth external terminal electrodes.

6. The monolithic capacitor according to claim 1, wherein the first and second external terminal electrodes are alternately arranged.

7. The monolithic capacitor according to claim 1, wherein, in the main capacitor unit, the first capacitor portion and the second capacitor portion are arrayed in a direction of lamination, and the first capacitor portion is located towards at least one end in the direction of lamination.

8. The monolithic capacitor according to claim 7, wherein, in the main capacitor unit, the second capacitor portion is sandwiched by two of the first capacitor portions in the direction of lamination.

9. A mounting structure of a monolithic capacitor, wherein the monolithic capacitor according to claim 7, is mounted on a mounting surface, the monolithic capacitor being mounted with the main capacitor unit arranged so that the first capacitor portion is located closer to the mounting surface than the second capacitor portion.

10. A monolithic capacitor comprising:
a main capacitor unit having a monolithic structure including a lamination of a plurality of dielectric layers; wherein
the main capacitor unit includes first and second capacitor portions;
the first capacitor portion includes at least one pair of first and second internal electrodes opposing each other via a predetermined one of the dielectric layers so as to define a capacitance;
the first internal electrode includes a plurality of first lead-out portions extending out to an outer surface of the main capacitor unit, and the second internal electrode includes a plurality of second lead-out portions extending out to the outer surface of the main capacitor unit;
the second capacitor portion includes at least one pair of third and fourth internal electrodes opposing each other via a predetermined one of the dielectric layers so as to define a capacitance;
the third internal electrode includes at least one third lead-out portion extending out to the outer surface of the main capacitor unit, and the fourth internal electrode includes at least one fourth lead-out portion extending out to the outer surface of the main capacitor unit;
first, second, third, and fourth external terminal electrodes electrically connected individually to the first, second, third, and fourth lead-out portions are provided on the outer surface of the main capacitor unit;
a resonant frequency of the first capacitor portion is greater than a resonant frequency of the second capacitor portion; and
an equivalent series resistance per layer provided by one pair of the third and fourth internal electrodes and an intervening one of the dielectric layers included in the second capacitor portion is greater than an equivalent series resistance per layer provided by one pair of the first and second internal electrodes and an intervening one of the dielectric layers included in the first capacitor portion.

11. The monolithic capacitor according to claim 10, wherein one of the third internal electrode and the fourth internal electrode has the same pattern as one of the first internal electrode and the second internal electrode.

12. The monolithic capacitor according to claim 10, wherein at least one of the first and second external terminal electrodes defines at least one of the third and fourth external terminal electrodes.

13. The monolithic capacitor according to claim 10, wherein the first and second external terminal electrodes are alternately arranged alternately.

14. The monolithic capacitor according to claim 10 wherein, in the main capacitor unit, the first capacitor portion and the second capacitor portion are arrayed in a direction of lamination, and the first capacitor portion is located towards at least one end in the direction of lamination.

15. The monolithic capacitor according to claim 14, wherein, in the main capacitor unit, the second capacitor portion is sandwiched by two of the first capacitor portions in the direction of lamination.

16. A mounting structure of a monolithic capacitor, wherein the monolithic capacitor according to claim 14 is mounted on a predetermined mounting surface, the monolithic capacitor being mounted with the main capacitor unit arranged so that the first capacitor portion is located closer to the mounting surface than the second capacitor portion.

* * * * *